United States Patent
Palanki et al.

(10) Patent No.: US 9,826,348 B2
(45) Date of Patent: Nov. 21, 2017

(54) METHOD AND APPARATUS FOR POSITIONING OF DEVICES IN A WIRELESS NETWORK

(71) Applicant: QUALCOMM Incorporated, San Diego, CA (US)

(72) Inventors: Ravi Palanki, San Diego, CA (US); Nathan Edward Tenny, Poway, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/268,875

(22) Filed: May 2, 2014

(65) Prior Publication Data

US 2014/0243018 A1    Aug. 28, 2014
US 2016/0261978 A9    Sep. 8, 2016

Related U.S. Application Data

(62) Division of application No. 12/985,523, filed on Jan. 6, 2011, now Pat. No. 8,750,870.
(Continued)

(51) Int. Cl.
*H04W 64/00*   (2009.01)
*H04W 4/02*    (2009.01)

(52) U.S. Cl.
CPC .......... *H04W 4/02* (2013.01); *H04W 64/003* (2013.01)

(58) Field of Classification Search
CPC ..... H04W 64/003; H04W 4/02; H04W 28/08; H04W 40/22; H04W 4/023; H04W 4/025;
(Continued)

(56) References Cited

U.S. PATENT DOCUMENTS 6,937,867 B2   8/2005  Oda et al.
7,577,443 B1   8/2009  Moll et al.
(Continued)

FOREIGN PATENT DOCUMENTS

CN    1790049 A      6/2006
CN    101365172 A    2/2009
(Continued)

OTHER PUBLICATIONS

European Search Report—EP13166224—Search Authority—Hague—dated Aug. 4, 2014.
(Continued)

*Primary Examiner* — Phuoc H Doan
(74) *Attorney, Agent, or Firm* — Mahmoud Munes Tomeh

(57) ABSTRACT

Methods and apparatuses are provided that facilitate allowing position determination of devices in wireless networks with home evolved Node Bs (HeNB). An HeNB can determine its location based at least in part on positioning measurements from one or more devices. The HeNB can additionally or alternatively register its location or other location parameters with a positioning server for subsequent provisioning as assistance information for determining a device position. Moreover, a device can request assistance information related to a different base station where the HeNB is not registered with the positioning server.

20 Claims, 17 Drawing Sheets

Related U.S. Application Data

(60) Provisional application No. 61/293,595, filed on Jan. 8, 2010, provisional application No. 61/294,050, filed on Jan. 11, 2010.

(58) Field of Classification Search
CPC ... H04W 24/08; H04W 76/023; H04W 8/005; H04W 4/008; H04L 5/0048; G01S 5/14
USPC ................. 455/456.2, 456.1, 422.1; 370/331
See application file for complete search history.

(56) References Cited

U.S. PATENT DOCUMENTS

| | | | |
|---|---|---|---|
| 2003/0045303 A1* | 3/2003 | Oda | H04W 64/00 455/456.1 |
| 2003/0216142 A1* | 11/2003 | Wigren | H04W 64/00 455/456.1 |
| 2006/0133271 A1* | 6/2006 | Mizugaki | G01S 5/06 370/229 |
| 2008/0188243 A1 | 8/2008 | Giustina et al. | |
| 2008/0299992 A1 | 12/2008 | Eitan et al. | |
| 2008/0318596 A1 | 12/2008 | Tenny | |
| 2009/0005031 A1 | 1/2009 | Van Lieshout et al. | |
| 2009/0146872 A1 | 6/2009 | Harper et al. | |
| 2009/0298515 A1 | 12/2009 | Czaja et al. | |
| 2010/0067482 A1 | 3/2010 | Vikberg et al. | |
| 2010/0331013 A1* | 12/2010 | Zhang | G01S 5/0242 455/456.2 |
| 2011/0201357 A1* | 8/2011 | Garrett | G01S 5/0252 455/456.2 |
| 2012/0015654 A1 | 1/2012 | Palanki et al. | |
| 2014/0094188 A1* | 4/2014 | Kazmi et al. | 455/456.1 |

FOREIGN PATENT DOCUMENTS

| | | |
|---|---|---|
| CN | 101529941 A | 9/2009 |
| EP | 2101524 A1 | 9/2009 |
| JP | 2003070051 A | 3/2003 |
| JP | 2009200644 A | 9/2009 |
| JP | 2009225015 A | 10/2009 |
| JP | 2010507963 A | 3/2010 |
| WO | 2008051124 A1 | 5/2008 |
| WO | 2008093103 A2 | 8/2008 |
| WO | 2008157841 | 12/2008 |
| WO | 2009017877 A2 | 2/2009 |
| WO | 2009120939 A1 | 10/2009 |

OTHER PUBLICATIONS

European Search Report—EP13166498—Search Authority—Hague—dated Aug. 4, 2014.

International Search Report and Written Opinion—PCT/US2011/020600, ISA/EPO—dated Jul. 21, 2011.

Taiwan Search Report—TW100100852—TIPO—dated Sep. 9, 2013.

* cited by examiner

METHOD AND APPARATUS FOR POSITIONING OF DEVICES IN A WIRELESS NETWORK

CLAIM OF PRIORITY UNDER 35 U.S.C. §119

The present Application for patent is a Divisional Application of application Ser. No. 12/985,523 entitled "METHOD AND APPARATUS FOR POSITIONING OF DEVICES IN A WIRELESS NETWORK" filed Jan. 6, 2011, which claims priority to Provisional Application No. 61/293,595 entitled "POSITIONING OF USER EQUIPMENT CONNECTED TO HOME EVOLVED NODE Bs AND SELF-POSITIONING OF HOME EVOLVED NODE Bs" filed Jan. 8, 2010, and assigned to the assignee hereof and hereby expressly incorporated by reference herein, and Provisional Application No. 61/294,050 entitled "METHOD AND APPARATUS TO ENABLE POSITIONING OF HOME EVOLVED NodeBs (HeNBs) AND CORRESPONDING USER EQUIPMENT" filed Jan. 11, 2010, and assigned to the assignee hereof and hereby expressly incorporated by reference herein.

BACKGROUND

Field

The following description relates generally to wireless network communications, and more particularly to positioning of home evolved Node Bs.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices can determine positioning at least in part by utilizing assisted global positioning system (GPS), observed time difference of arrival (OTDOA) or other triangulation techniques involving one or more base stations, enhanced cell identifier (E-CID), and/or the like. For example, a positioning server, such as a serving mobile location center (SMLC), evolved SMLC (eSMLC), etc., can provide assistance information to the device to facilitate performing such measurements for computing a position of the device. In one example, the assistance information can relate to a location of one or more base stations (e.g., latitude/longitude location, geographic area, neighboring cells and related information, and/or the like). A wireless network can include one or more home evolved Node Bs (HeNB), however, which can be deployed, without planning, in substantially any location. Moreover, for example, the positioning server may not be aware of positioning information for the HeNBs. This can inhibit positioning determination at one or more devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating positioning determination at devices in a wireless network that includes home evolved Node Bs (HeNB). In one example, the HeNB can determine its location based at least in part on positioning measurements from one or more devices, whether the devices include those served by the HeNB, a network listening module at the HeNB, and/or the like. Moreover, in this or another example, the HeNB can provide its determined location, or one or more other parameters regarding location, however coarse, to a positioning server for subsequent utilization by a device in determining a position. In another example, where the HeNB is not registered with the positioning server, the device can request the positioning server to provide assistance information of a different neighboring cell. In an example, the device can determine the different neighboring cell based at least in part on detecting signals therefrom, determining a previously visited cell, receiving parameters regarding the cell from the HeNB, and/or the like.

According to an example, a method for determining a location for a HeNB is provided that includes receiving one or more positioning measurements measured by one or more devices in a wireless network and determining a location based at least in part on the one or more positioning measurements.

In another aspect, an apparatus for determining a HeNB location is provided that includes at least one processor configured to initialize an autonomous gap for receive one or more positioning measurements measured by one or more devices in a wireless network in which a HeNB communicates and determine a location of the HeNB based at least in part on the one or more positioning measurements. In addition, the apparatus includes a memory coupled to the at least one processor.

In yet another aspect, an apparatus for determining a location for a HeNB is provided that includes means for receiving one or more positioning measurements measured by one or more devices in a wireless network in which a HeNB communicates. The apparatus further includes means for determining a location of the HeNB based at least in part on the one or more positioning measurements.

Still, in another aspect, a computer-program product is provided for determining a location for a HeNB including a computer-readable medium having code for causing at least one computer to receive one or more positioning measurements measured by one or more devices in a wireless network in which a HeNB communicates. The computer-readable medium further includes code for causing the at least one computer to determine a location of the HeNB based at least in part on the one or more positioning measurements.

Moreover, in an aspect, an apparatus for determining a location for a HeNB is provided that includes a positioning measurement receiving component for obtaining one or more positioning measurements measured by one or more devices in a wireless network in which a HeNB communicates. The apparatus further includes a location determining component for computing a location of the HeNB based at least in part on the one or more positioning measurements.

According to another example, a method of wireless communication is provided that includes determining a different base station from a serving HeNB for utilizing assistance information in determining a position and receiving assistance information related to the different base station from the serving HeNB or a positioning server.

In another aspect, an apparatus for requesting assistance information in determining positioning is provided that includes at least one processor configured to determine a different base station from a serving HeNB for utilizing assistance information in determining a position and obtain assistance information related to the different base station from the serving HeNB or a positioning server. In addition, the apparatus includes a memory coupled to the at least one processor.

In yet another aspect, an apparatus for requesting assistance information for determining positioning is provided that includes means for determining a different base station from a serving HeNB for utilizing assistance information in determining a position. The apparatus further includes means for receiving assistance information related to the different base station from the serving HeNB or a positioning server.

Still, in another aspect, a computer-program product is provided for requesting assistance information for determining a position including a computer-readable medium having code for causing at least one computer to determine a different base station from a serving HeNB for utilizing assistance information in determining a position. The computer-readable medium further includes code for causing the at least one computer to obtain assistance information related to the different base station from the serving HeNB or a positioning server.

Moreover, in an aspect, an apparatus for requesting assistance information for determining positioning is provided that includes a neighboring cell information receiving component for determining a different base station from a serving HeNB for utilizing assistance information in determining a position. The apparatus further includes an assistance information receiving component for receiving assistance information related to the different base station from the serving HeNB or a positioning server.

According to yet another example, a method of wireless communication is provided that includes receiving one or more parameters related to a location and registering a global cell identifier and the one or more parameters with a positioning server over a backhaul link.

In another aspect, an apparatus for registering with a positioning server is provided that includes at least one processor configured to determine one or more parameters related to a location and register a global cell identifier and the one or more parameters with a positioning server over a backhaul link. In addition, the apparatus includes a memory coupled to the at least one processor.

In yet another aspect, an apparatus for registering with a positioning server is provided that includes means for receiving one or more parameters related to a location. The apparatus further includes means for registering a global cell identifier and the one or more parameters with a positioning server over a backhaul link.

Still, in another aspect, a computer-program product is provided for registering with a positioning server including a computer-readable medium having code for causing at least one computer to determine one or more parameters related to a location. The computer-readable medium further includes code for causing the at least one computer to register a global cell identifier and the one or more parameters with a positioning server over a backhaul link.

Moreover, in an aspect, an apparatus for registering with a positioning server is provided that includes a location determining component for receiving one or more parameters related to a location. The apparatus further includes a location registering component for registering a global cell identifier and the one or more parameters with a positioning server over a backhaul link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
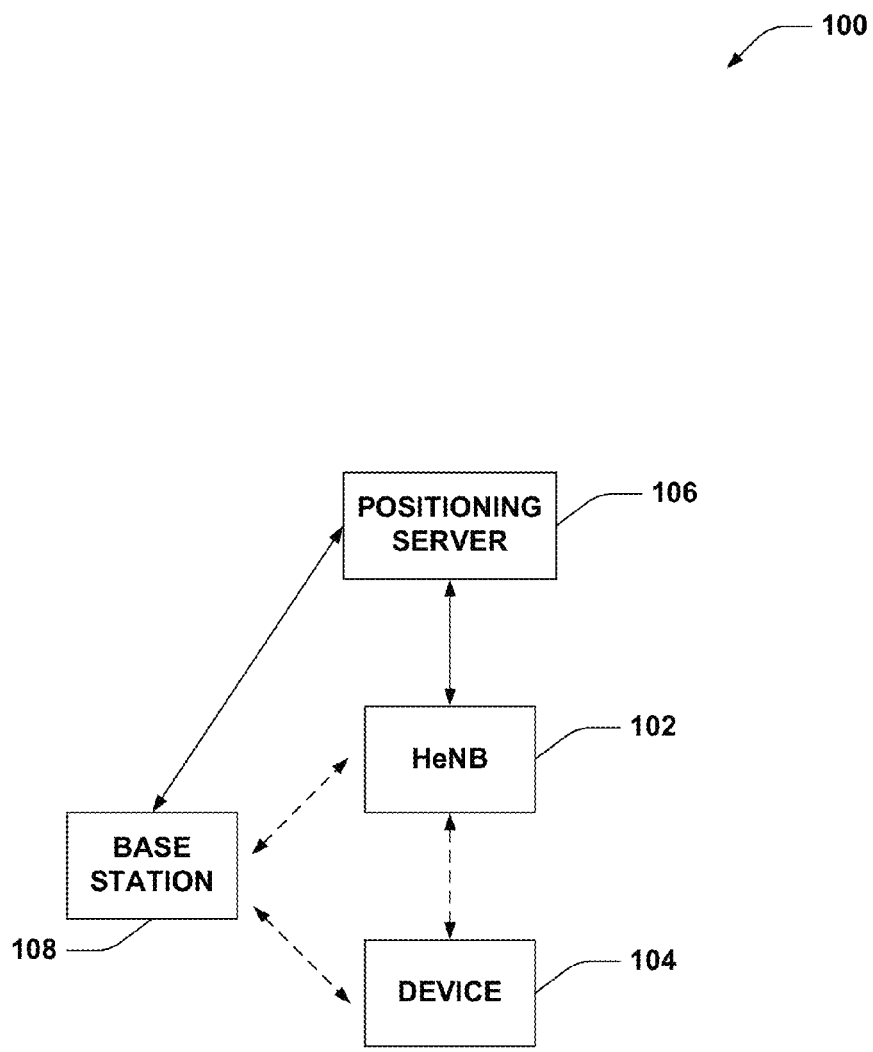
FIG. 1 illustrates an example system for providing device positioning determination with home evolved Node Bs (HeNB).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, positioning is provided for wireless networks that employ one or more home evolved Node Bs (HeNB). In one example, an HeNB can determine a location based at least in part on positioning related measurements from one or more devices. In this example, or where HeNB otherwise possesses one or more parameters regarding location, however coarse, HeNB can communicate the location or one or more parameters to a positioning server, such that one or more devices can utilize the location or one or more parameters in subsequently determining a position of the device. Moreover, in an example, a device served by a HeNB that is not registered with the positioning server can request the positioning server to provide assistance information of one or more neighboring cells (e.g., a cell hearable at the device and/or a previously visited cell). In addition, for example, the HeNB can provision at least a portion of neighboring cell information to the device for determining positioning or otherwise requesting assistance information. Thus, devices can perform positioning determination in networks with HeNBs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates positioning determination in a network that employs HeNBs. System 100 includes a HeNB 102 that can provide network access to one or more devices, such as device 104. HeNB 102 can additionally communicate with a positioning server 106 at least in part to provide positioning assistance information to device 104. In addition, system 100 includes a base station 108 that neighbors HeNB 102 and/or device 104; in one example, HeNB 102 can provide network access within a cell of base station 108. HeNB 102 can be a femtocell, picocell, or similar base station of smaller scale than a macrocell base station that is deployable in substantially any location (e.g., a home or business), a portion thereof, etc. For example, HeNB 102 can utilize a broadband Internet backhaul to communicate with a core wireless network (not shown), which can include positioning server 106, while providing wireless access to device 104 and/or one or more additional devices. Device 104 can be a UE, modem (or other tethered device), a portion thereof, and/or substantially any device that can communicate with HeNB 102 to receive wireless network access. Base station 108 can be a macrocell base station, a HeNB, a relay node, mobile base station, device communicating in peer-to-peer mode, a portion thereof, etc.

According to an example, device 104 can measure its position (e.g., using assisted global positioning system (A-GPS) or other global navigation satellite systems (GNSS), observed time difference of arrival (OTDOA) or other triangulation/trilateration techniques, enhanced cell identifier (E-CID), and/or the like). For example, the above techniques can be performed based at least in part on measuring or otherwise receiving signals from one or more base stations, such as base station 108. As described, device 104 can receive assistance information from positioning server 106 (such as a location of the one or more base stations) for performing such measurements (e.g., through HeNB 102 where device 104 communicates therewith). In one example, device 104 can also receive assistance information for HeNB 102 from positioning server 106 and can accordingly also measure HeNB 102 signals for determining positioning.

In this example, HeNB 102 can register with the positioning server 106 providing its geographic location and/or other parameters related to a location along with a global cell identifier and/or similar parameters. For example, the geographic location can be substantially any location data or related parameters, such as a location determined by HeNB 102, as described herein, an identifier of a neighboring macrocell, a point-of-interest in a GPS system (e.g., an address, zip code, city, county, state, province, country, store name/address, etc.), and/or the like. In one example, HeNB 102 can acquire the geographic location from a HeNB management system (HeMS), or another node to which it communicates that has planned deployment and/or a geographic association. In another example, the location or parameters of HeNB 102 can be a location of one or more neighboring cells or related base stations. In yet another example, the one or more parameters related to a location may not be a location, but can include an identifier of a neighboring cell or related base station, a positioning error of HeNB 102, a transmission power of HeNB 102, a cell size of HeNB 102, and/or the like.

In an example, HeNB 102 can compute its geographic location based at least in part on receiving positioning measurements (e.g., in a measurement report, or based on requesting the measurements) or a computed position from one or more devices. In one example, device 104 can provide positioning measurements or a computed position, as described above, to HeNB 102, and HeNB 102 can determine its approximate location based at least in part on the positioning measurements or computed position (e.g., using similar positioning techniques as the device, as described herein). In another example, HeNB 102 can comprise a network listening module (NLM) or similar UE-type device co-located at HeNB 102 that can perform positioning measurements similarly to device 104, as described above.

Moreover, in yet another example, HeNB 102 may not be registered with positioning server 106. Where device 104 is connected to HeNB 102, for example, device 104 can be provided assistance information from positioning server 106 regarding a neighboring cell or related base station, such as base station 108. For example, device 104 can determine to request base station 108 assistance information based at least in part on detecting one or more signals from base station 108, determining that base station 108 is a previously visited base station, and/or the like. In another example, positioning server 106 can provide assistance information regarding the neighboring cell or related base station based at least in part on identifying the serving base station 102 of device 104. In one example, HeNB 102 can provision information regarding neighboring cells or related base stations, such as base station 108, to device 104 (e.g., at least one of parameters for determining the assistance information, such as a macrocell identifier of base station 108, assistance information, such as a location of base station 108, and/or the like).

Figure 2:
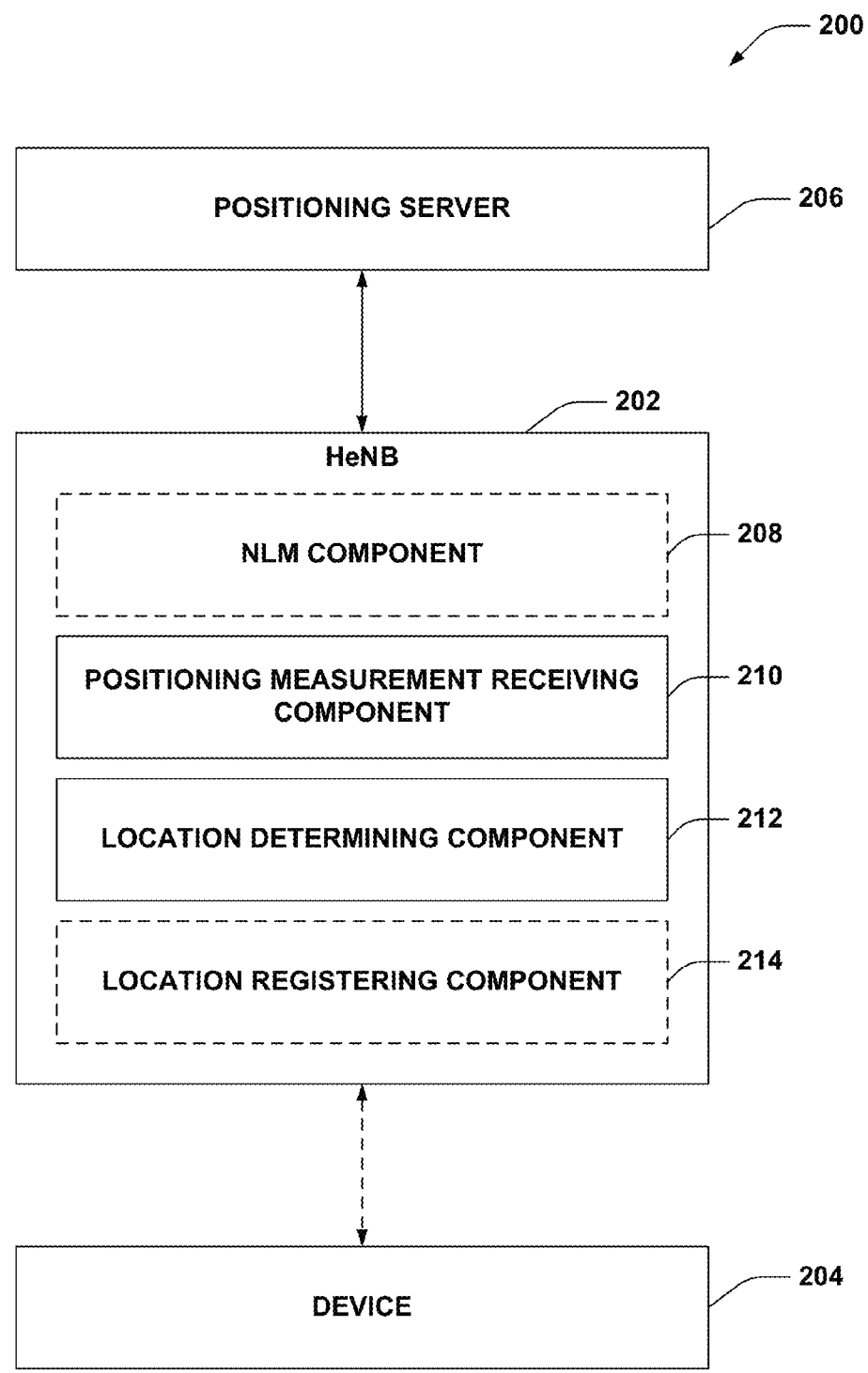
FIG. 2 illustrates an example system for determining a location of an HeNB.

Turning to FIG. 2, an example wireless communication system 200 is illustrated that facilitates determining a location of an HeNB. System 200 includes HeNB 202, which as described, can provide one or more devices, such as device 204, with access to a core wireless network. In addition, HeNB 202 can communicate with positioning server 206 to obtain assistance information for allowing device 204 to determine a position. As described, HeNB 202 can be a femtocell, picocell, or similar base station, device 204 can be a UE, modem, etc., and positioning server 206 can be an eSMLC or other core network component, and/or the like.

HeNB 202 can comprise an optional NLM component 208 for receiving downlink signals from one or more base stations (not shown) in a wireless network, and a positioning measurement receiving component 210 for obtaining one or more positioning measurements from one or more devices. HeNB 202 also comprises a location determining component 212 for retrieving or otherwise computing a location of HeNB 202 (e.g., based at least in part on the one or more positioning measurements), and a location registering component 214 for communicating the location of the HeNB 202 to positioning server 206.

According to an example, HeNB 202 can determine its location based at least in part on one or more positioning measurements by one or more devices within a coverage area of HeNB 202. In one example, device 204 can perform positioning measurements based at least in part on one or more neighboring base stations (not shown). For example, device 204 can utilize A-GPS, A-GNSS, OTDOA, E-CID, or similar positioning determination techniques to compute the positioning measurements in a wireless network, as described. In addition, the positioning measurements can relate to a position determined according to one or more positioning determination techniques, parameters for determining a position (e.g., signal strength of the one or more neighboring base stations, location of the one or more neighboring base stations, and/or the like), etc. In yet another example, the one or more positioning measurements can be a GPS location determined by a GPS receiver on device 204. Device 204, in this example, can provide the positioning measurements to HeNB 202, and positioning measurement receiving component 210 can obtain the positioning measurements. In this example, location determining component 212 can compute a location of HeNB 202 based at least in part on the received positioning measurements. Moreover, for example, it is to be appreciated that HeNB can be serving device 204 or not.

In one example, where the positioning measurements relate to signal strengths and locations of neighboring base stations, for example, location determining component 212 can collect the positioning measurements of the one or more devices, such as device 204, and determine the location of HeNB 202 based at least in part on the positioning measurements. In this regard, for example, positioning measurement receiving component 210 can function similarly to a location service (LCS) client (e.g., as defined in UMTS) to receive the positioning measurements from device 204. In another example, location determining component 212 can determine the position of each device, such as device 204, based on the positioning measurements, and can utilize the positions for determining location of HeNB 202 (e.g., using triangulation/trilateration based additionally on pathloss, signals strength, etc. of the devices, such as device 204). In yet another example, the positioning measurements can relate to positions computed by the one or more devices, such as device 204, and the location determining component 212 can determine the location based on the positions, as described.

In an additional or alternative example, NLM component 208 can similarly perform A-GPS, A-GNSS, OTDOA, E-CID, or similar position determining techniques based at least in part on signals received from one or more neighboring cells or related base stations. In one example, it is to be appreciated that location determining component 212 can obtain assistance information for the one or more neighboring cells from positioning server 206 over a backhaul link with a core network (not shown), e.g., since NLM component 208 can receive only downlink signals. In either case, location determining component 212 can utilize the positioning measurements from NLM component 208 (e.g., alone or in conjunction with measurements from device 204 or one or more other devices) in computing location of HeNB 202. Moreover, in an example, location registering component 214 can transmit the location of HeNB 202 or related information to positioning server 206. In one example, location registering component 214 can communicate the positioning measurements to the positioning server 206 along with the global cell identifier. As described in further detail below, positioning server 206 can communicate the location along with a global cell identifier or similar information of HeNB 202 to the device 204 as assistance information for HeNB 202 to facilitate determining a position of device 204, as described herein.

Figure 3:
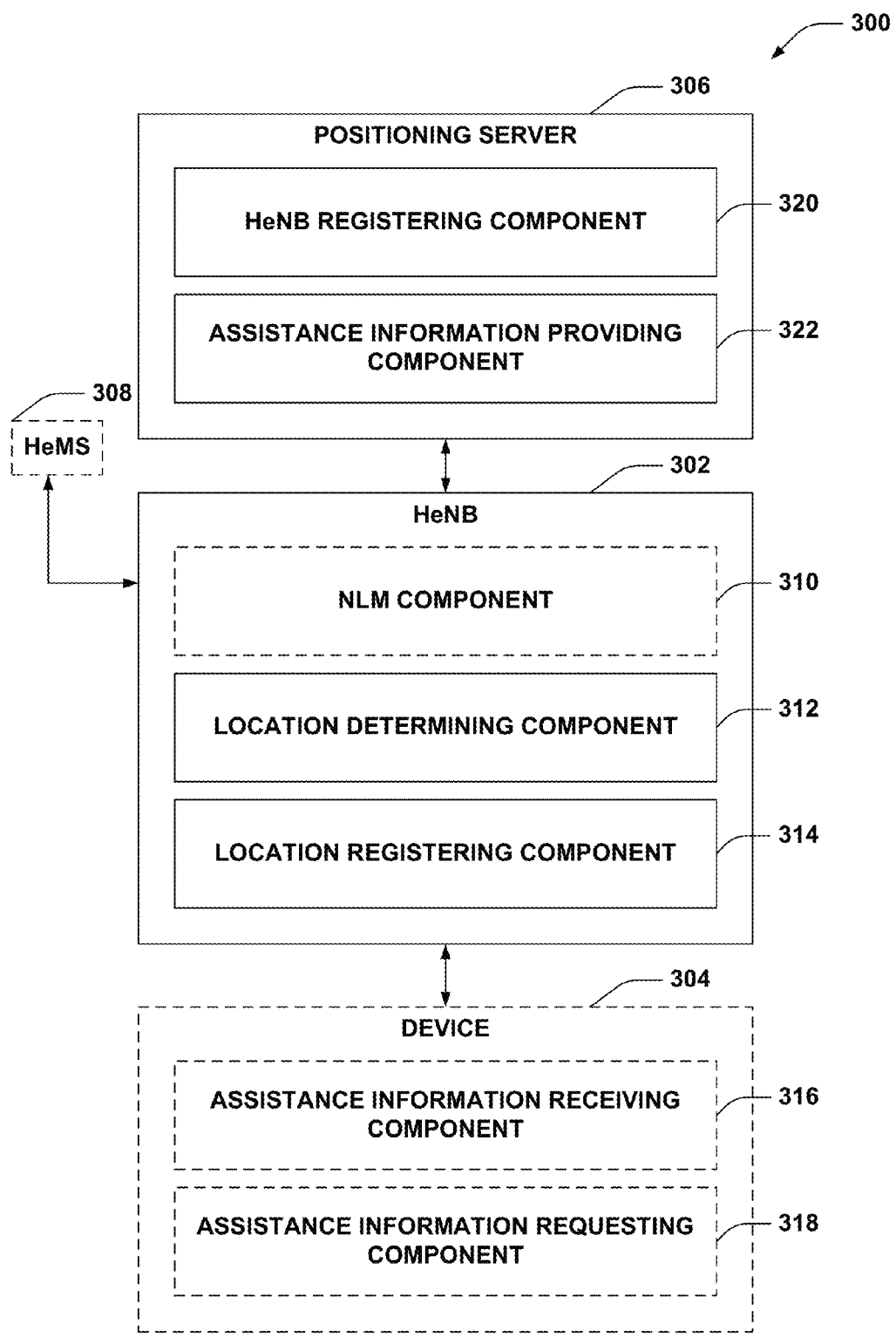
FIG. 3 illustrates an example system for registering a location of an HeNB with a positioning server.

Referring to FIG. 3, illustrated is an example wireless communication system 300 that facilitates registering with a positioning server. System 300 can include a HeNB 302 that can optionally communicate with one or more devices, such as device 304, to provide access to a wireless network. System 300 also includes a positioning server 306 that provides assistance information regarding one or more base stations or related cells for computing a position, as described. Furthermore, HeNB 302 can optionally communicate with an HeMS 308 to receive access to the wireless network. HeNB 302 can be a femtocell, picocell, or similar base station, device 304 can be a UE, modem, etc., and positioning server 306 can be an eSMLC, etc., as described.

HeNB 302 comprises an optional NLM component 310 for measuring signals from one or more neighboring base stations, a location determining component 312 for obtaining a location of HeNB 302, and a location registering component 314 for communicating the location and/or related information to positioning server 306. Device 304 can optionally comprise an assistance information receiving component 316 that obtains assistance information related to an HeNB or one or more other base stations (not shown), and an assistance information requesting component 318 that can transmit a request for assistance information to a positioning server. In addition, positioning server 306 can comprise an HeNB registering component 320 that associates an HeNB with a location or related parameters based at least in part on a registration, and an assistance information providing component 322 that determines and provides assistance information based on a request from one or more devices.

According to an example, location determining component 312 can discern one or more parameters related to a location of HeNB 302. The one or more parameters can relate to a location of varying precision, and thus can include a latitude/longitude location of HeNB 302, an identifier of a neighboring macrocell base station (e.g., a macrocell identifier), a point-of-interest in a GPS system (e.g., an address, zip code, city, county, state, store name/address, etc.) a relative position thereto, and/or the like. For example, location determining component 312 can compute the location (e.g. based on positioning measurements from one or more devices), as described previously, receive the location from a configuration of HeNB 302, retrieve the location from one or more network nodes (e.g., with planned deployment or other geographic association, such as HeMS 308, and/or the like), receive the location from a device, etc. In any case, location registering component 314, for example, can register the location or one or more parameters related to the location along with a global cell identifier of HeNB 302 with a positioning server 306. In this example, HeNB registering component 320 can receive the location or one or more parameters and global cell identifier, and can store assistance information for HeNB 302.

In this regard, for example, assistance information requesting component 318 can transmit a request for assistance information related to HeNB 302 to positioning server 306, assistance information providing component 322 can return the one or more parameters registered for the HeNB 302, and assistance information receiving component 316 can obtain the one or more parameters, for example. As described above, device 304 can subsequently determine a position based at least in part on the one or more parameters. In another example, location registering component 314 can provide one or more positioning measurements received from one or more devices to positioning server 306, and HeNB registering component 320 can compute a location of HeNB 302 based at least in part on the positioning measurements and can store the computed location with the global cell identifier as assistance information.

In one specific example, NLM component 310 can determine one or more identifiers of one or more neighboring cells (e.g., a macrocell identifier), and location determining component 312 can associate the location to the one or more identifiers. In another example, location determining component 312 can receive the one or more identifiers from one or more devices (e.g., in a measurement report), which can include NLM component 310, device 304, and/or the, like listening to signals from the neighboring base stations to determine the one or more identifiers. Thus, in this example, location registering component 314 can provide the one or more identifiers to the positioning server 306 along with a global cell identifier of HeNB 302. HeNB registering component 320 can receive the one or more identifiers and global cell identifier for storing as assistance information of HeNB 302. Thus, as described in one example, assistance information providing component 322 can provide the one or more identifiers as assistance information for HeNB 302.

In this example, assistance information requesting component 318 can subsequently transmit a request for assistance information for HeNB 302 to positioning server 306, and assistance information providing component 322 can return the one or more identifiers of the one or more neighboring cells. In this regard, assistance information receiving component 316 can obtain the one or more identifiers, and assistance information requesting component 318 can request assistance information for the one or more neighboring cell identifiers from positioning server 306. In another example, upon positioning server 306 receiving the request for assistance information of HeNB 302, assistance information providing component 322 can determine that the assistance information associated with HeNB 302 corresponds to one or more neighboring cell identifiers, and can instead return assistance information for the one or more neighboring cells. In yet another example, HeNB registering component 320 can store the assistance information for the one or more neighboring cells upon receiving the registration request from HeNB 302 comprising the one or more identifiers of the one or more neighboring cells.

In another example, location determining component 312 can determine a location according to one or more planned network nodes, such as HeMS 308. In this example, location determining component 312 can receive or otherwise determine a location of HeMS 308, e.g., a zip code, city, county, state, country, address, point-of-interest, and/or the like. In any case, location registering component 314 can provide the location (e.g., along with a global cell identifier), to positioning server 306 for subsequent provisioning as assistance information, and HeNB registering component 320 can store the location as assistance information for HeNB 302, as described. In addition, location determining component 312 can discern a positioning error, transmission power, cell size, etc. of HeNB 302, and location registering component 314 can additionally provision one or more of these parameters to positioning server 306, for subsequent use as assistance information for determining a position by one or more devices. In one example, location determining component 312 can obtain the positioning error from a configuration, specification, hardcoding, etc. In another example, location determining component 312 can compute the positioning error based at least in part on a number of base stations from which positioning is determined by NLM component 310, a number of devices from which positioning parameters are received, and/or the like.

Figure 4:
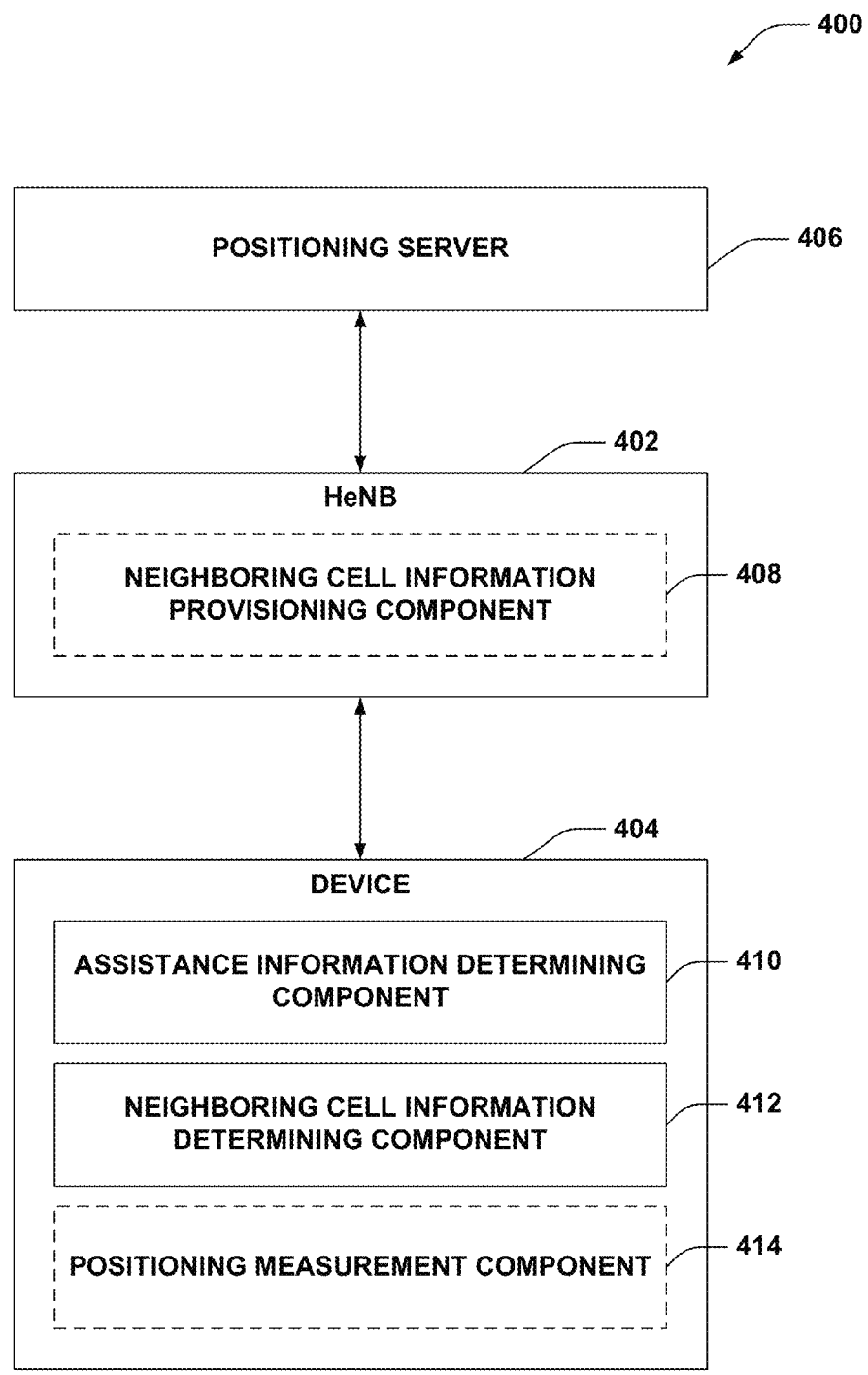
FIG. 4 illustrates an example system that facilitates receiving assistance information for determining a device position.

Turning to FIG. 4, an example wireless communications system 400 for allowing position determination when communicating with a non-registered HeNB is illustrated. System 400 includes an HeNB 402, which can provide wireless network access to one or more devices, such as device 404, as described. System 400 also includes a positioning server 406, as described, for providing assistance information for determining positioning. Moreover, as described, HeNB 402 can be a femtocell, picocell, etc., device 404 can be a UE, modem, etc., and positioning server 406 can be an eSMLC or similar core network component that provides assistance information related to one or more base stations or related cells.

HeNB 402 comprises a neighboring cell information provisioning component 408 that provides one or more parameters regarding one or more neighboring cells to a device to facilitate determining positioning. Device 404 comprises an assistance information determining component 410 that obtains assistance information related to the one or more neighboring cells, a neighboring cell information receiving component 412 that obtains or more parameters regarding one or more neighboring cells, and an optional positioning measurement component 414 that determines one or more positioning measurements based at least in part on the one or more parameters.

According to an example, device 404 can communicate with HeNB 402 to access a wireless network, and thus HeNB 402 can be a serving HeNB to device 404. Device 404 can additionally determine its position using one or more position determining techniques, as described previously, such as A-GPS, OTDOA, E-CID, and/or the like. In this regard, assistance information determining component 410 can transmit a request for assistance information to positioning server 406, as described. In one example, assistance information determining component 410 can transmit a request for assistance information, and positioning server 406 can return an indication that it does not have such assistance information or that serving HeNB 402 is otherwise unregistered with positioning server 406.

For example, neighboring cell information receiving component 412 can detect the neighboring cell (e.g., based at least in part on receiving one or more signals therefrom), identify the neighboring cell as a previously visited cell (e.g., based at least in part on a stored history of cells), and/or the like. In this example, assistance information determining component 410 can obtain assistance information of the previously visited cell (e.g., which assistance information determining component 410 can have stored when communicating with the previously visited cell). Moreover, for example, positioning measurement component 414 can utilize assistance information determining a position of device 404. In another example, neighboring cell information provisioning component 408 can transmit information regarding one or more neighboring cells to device 404, such as an identification of the one or more neighboring cells, assistance information related to the one or more neighboring cells, etc. Thus, assistance information determining component 410 can receive the assistance information regarding the one or more neighboring cells from serving HeNB 402, and neighboring cell information determining component 412 can obtain an identifier of the one or more neighboring cells or otherwise identify neighboring cells related to the assistance information received from HeNB 402. In this regard, positioning measurement component 414 can accordingly determine a position of device 404 based at least in part on the received assistance information, identifying the one or more neighboring cells, etc.

Referring to FIGS. 5-8, example methodologies relating to providing positioning determination in wireless networks with HeNBs are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
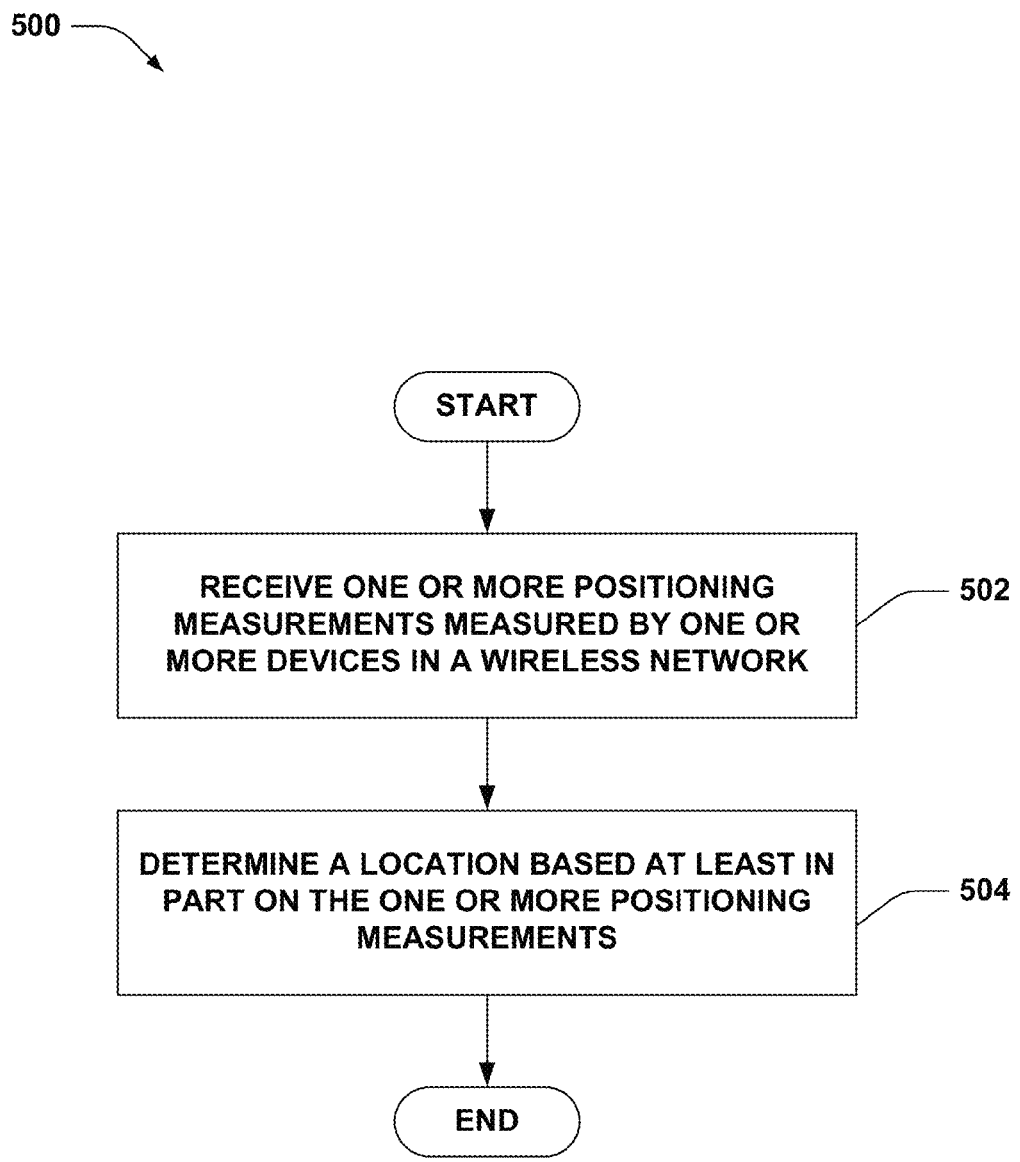
FIG. 5 illustrates an example methodology that determines a location based on received positioning measurements.

Referring to FIG. 5, an example methodology 500 is displayed that facilitates determining a location based at least in part on received positioning measurements. At 502, one or more positioning measurements measured by one or more devices in a wireless network in which a HeNB communicates can be received. As described, the one or more positioning measurements can be measured by one or more served devices, a co-located NLM, etc. Where the one or more devices are served devices, for example, the one or more positioning measurements can also include assistance information received by the one or more devices. Alternatively, and/or where the one or more devices are a co-located NLM, assistance information can be received over a backhaul link with a positioning server. The one or more measurements can include signal strength, SNR, or similar measurements of base stations, and the assistance information can include a location of the base stations, for example. In another example, the one or more measurements can include pathloss to the devices, and the assistance information can include computed positions of the devices. At 504, a location of the HeNB can be determined based at least in part on the positioning measurements. For example, this can be determined using A-GPS, OTDOA, E-CID, and/or similar positioning determination techniques based at least in part on the one or more positioning parameters and/or assistance information. Moreover, in an example, the location can be registered with a positioning server to facilitate subsequent positioning determination by one or more served devices.

Figure 6:
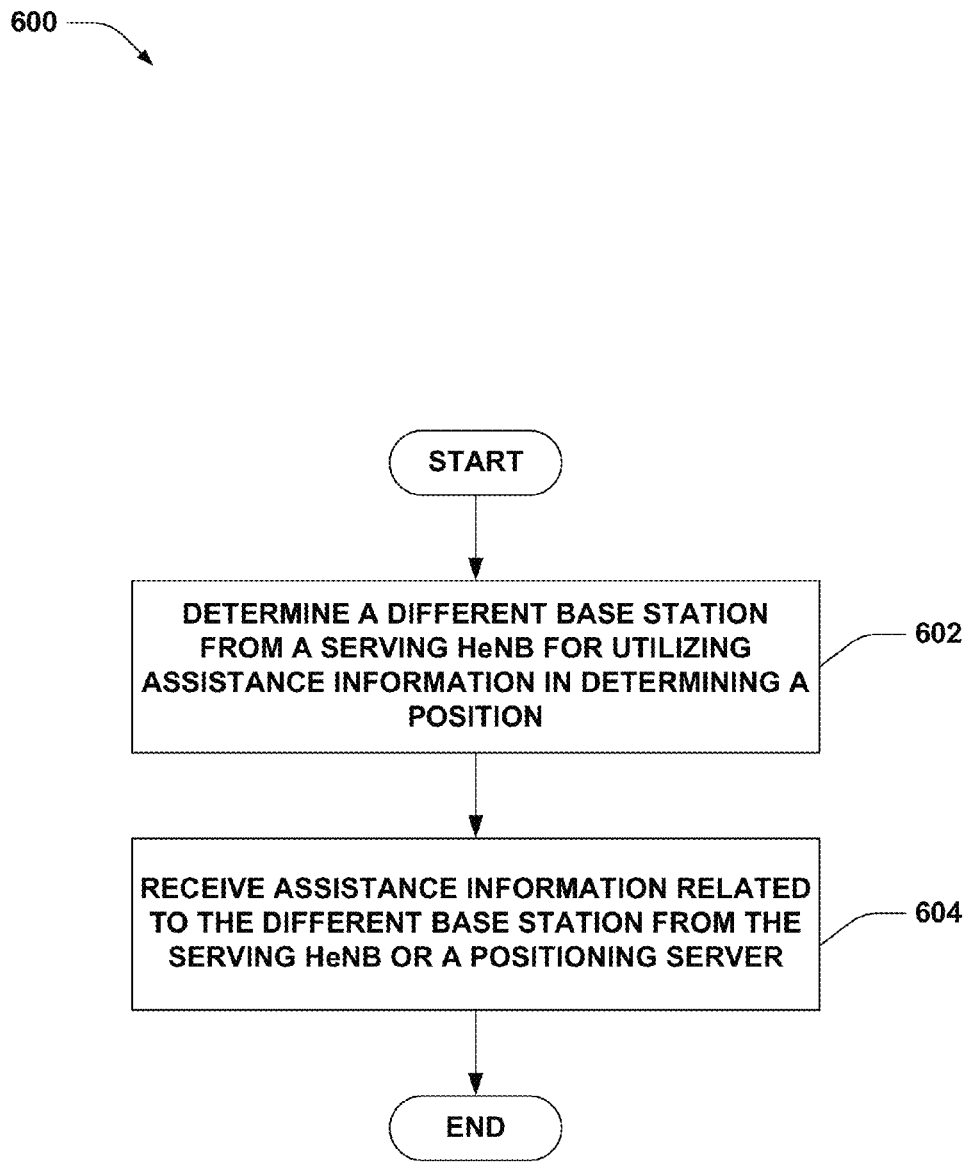
FIG. 6 illustrates an example methodology that requests assistance information for a base station different from a serving HeNB.

Turning to FIG. 6, an example methodology 600 is displayed that facilitates determining a position when communicating with an HeNB that is not registered with a positioning server. At 602, a different base station from a serving HeNB can be determined for utilizing assistance information in determining a position. For example, this can include determining that the serving HeNB is not registered with a positioning server (e.g., based at least in part on receiving an indication of such when requesting assistance information for the HeNB). Thus, at 602, the different base station can be determined based at least in part on receiving signals from the different base station, determining a previously visited base station, receiving parameters regarding the different base station from the HeNB, and/or the like. In any case, at 604, assistance information related to the different base station can be received from the serving HeNB or a positioning server. Thus, a position can be determined based at least in part on assistance information of a different base station than the serving HeNB.

Figure 7:
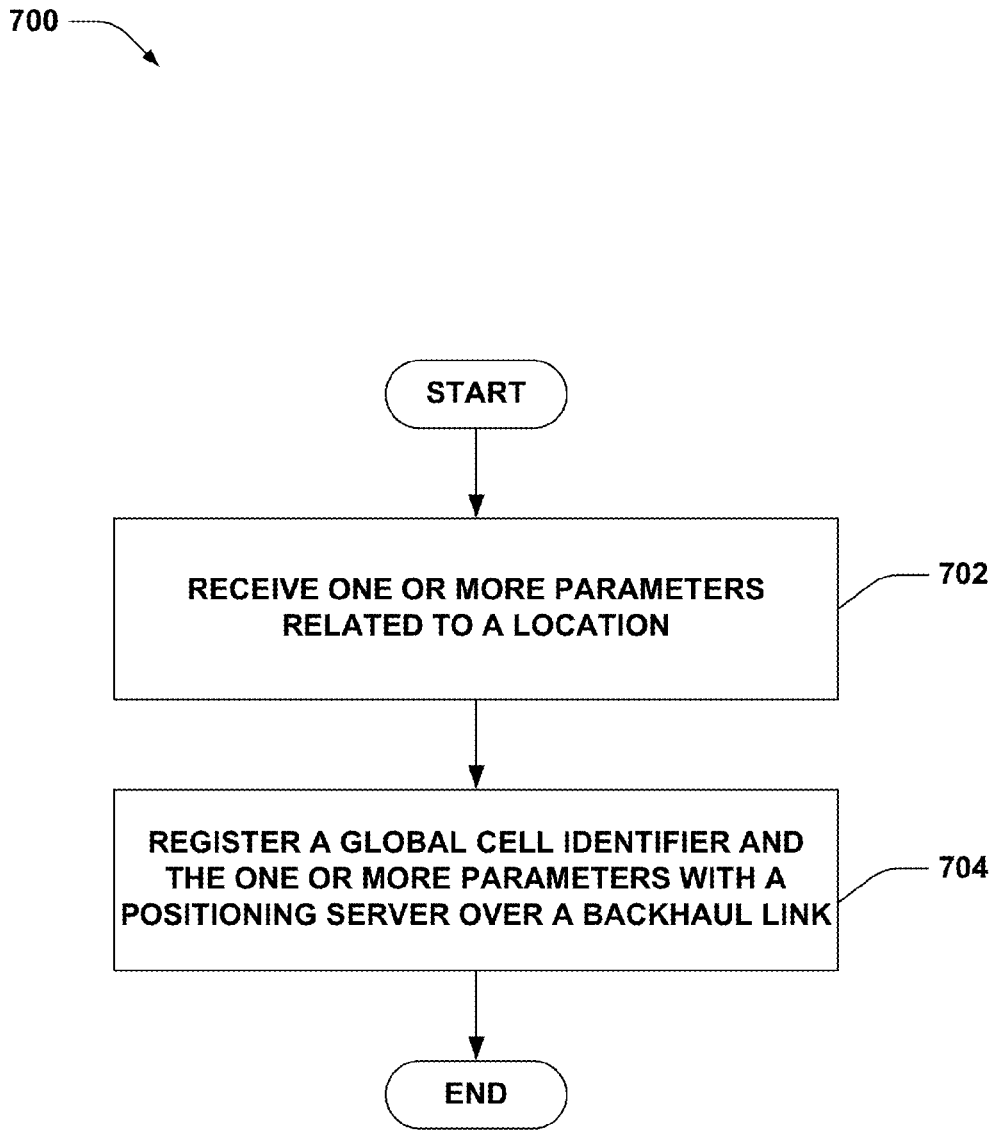
FIG. 7 illustrates an example methodology for registering location parameters with a positioning server.

Referring to FIG. 7, illustrated is an example methodology 700 for registering a location with a positioning server. At 702, one or more parameters related to a location can be received. For example, the one or more parameters can be received from a network component with geographic association (e.g., HeMS), from one or more devices, from a configuration, based on determining the position, as described, and/or the like. In addition, the one or more parameters can be a coarse or more accurate location, such as an address or geographic area, such as a zip code, city, state, etc. In another example, the one or more parameters can be an identifier of a nearby macrocell base station. In yet another example, the one or more parameters can relate to a positioning error, transmission power, cell size, and/or other similar parameters. In any case, at 704, a global cell identifier and the one or more parameters can be registered with a positioning server over a backhaul link. In this regard, as described, the positioning server can provide the one or more parameters as assistance information in response to subsequent device requests to facilitate determining device positioning.

It will be appreciated that, in accordance with one or more aspects described herein, inferences can be made regarding determining a position of an HeNB, determining a base station for which to request assistance information when communicating with an HeNB not registered with a positioning server, determining a positioning error associated with an HeNB, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
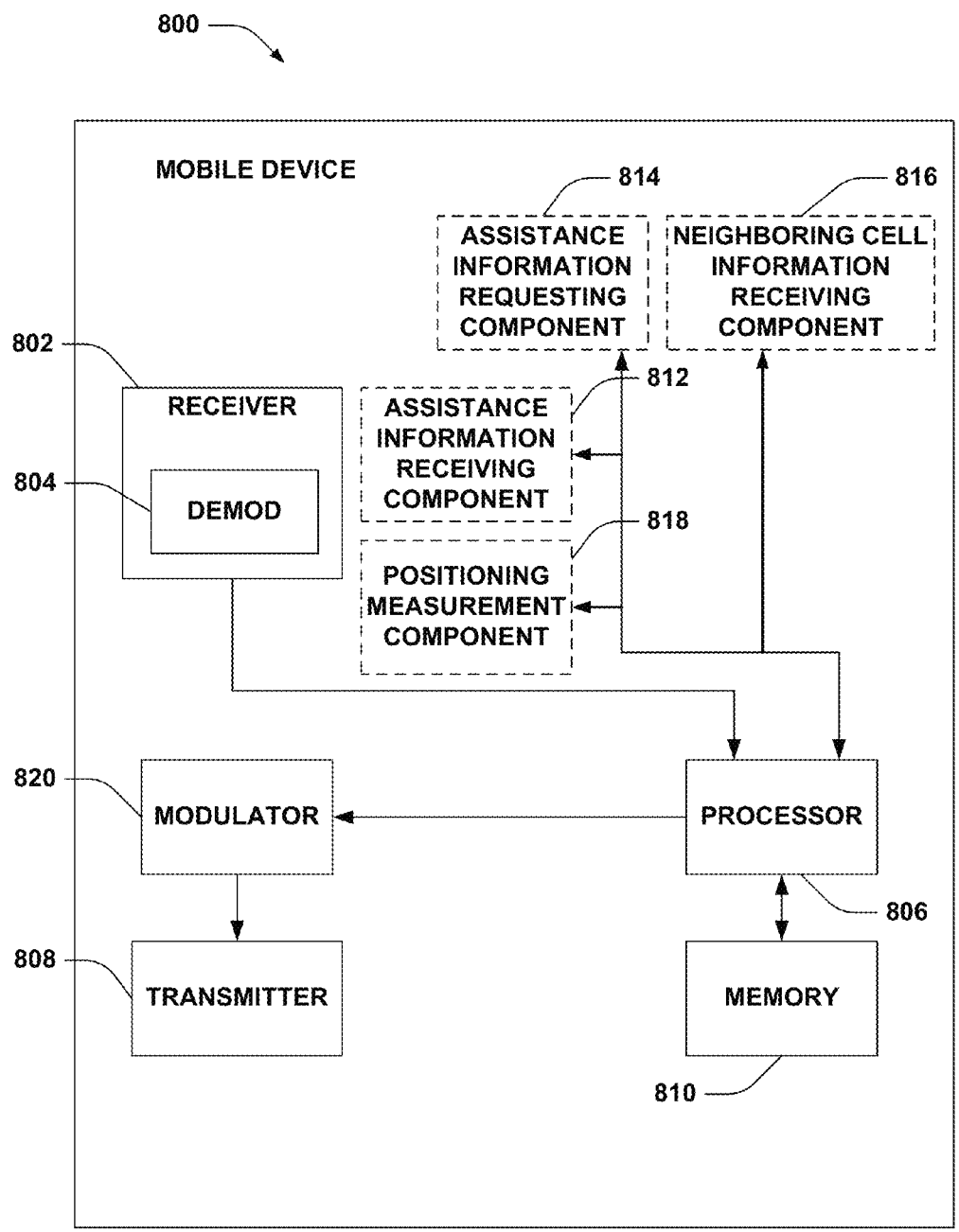
FIG. 8 illustrates an example mobile device that requests assistance information for determining a position.

FIG. 8 is an illustration of a mobile device 800 that facilitates determining a position. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800.

Mobile device 800 can additionally comprise memory 810 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 810 can additionally store protocols and/or algorithms associated with estimating and/or utilizing a channel (e.g., performance based, capacity based, etc.).

It will be appreciated that the data store (e.g., memory 810) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

Processor 806 can further be optionally operatively coupled to an assistance information receiving component 812, which can be similar to assistance information receiving component 316, an assistance information requesting component 814, which can be similar to assistance information requesting component 318 or assistance information determining component 410. Processor 806 can also be optionally operatively coupled to a neighboring cell information receiving component 816, which can be similar to neighboring cell information receiving component 412, and a positioning measurement component 818, which can be similar to positioning measurement component 414. Mobile device 800 still further comprises a modulator 820 that modulate signals for transmission by transmitter 808 to, for instance, a base station, another mobile device, etc. Although depicted as being separate from the processor 806, it is to be appreciated that the assistance information receiving component 812, assistance information requesting component 814, neighboring cell information receiving component 816, positioning measurement component 818, demodulator 804, and/or modulator 820 can be part of the processor 806 or multiple processors (not shown).

Figure 9:
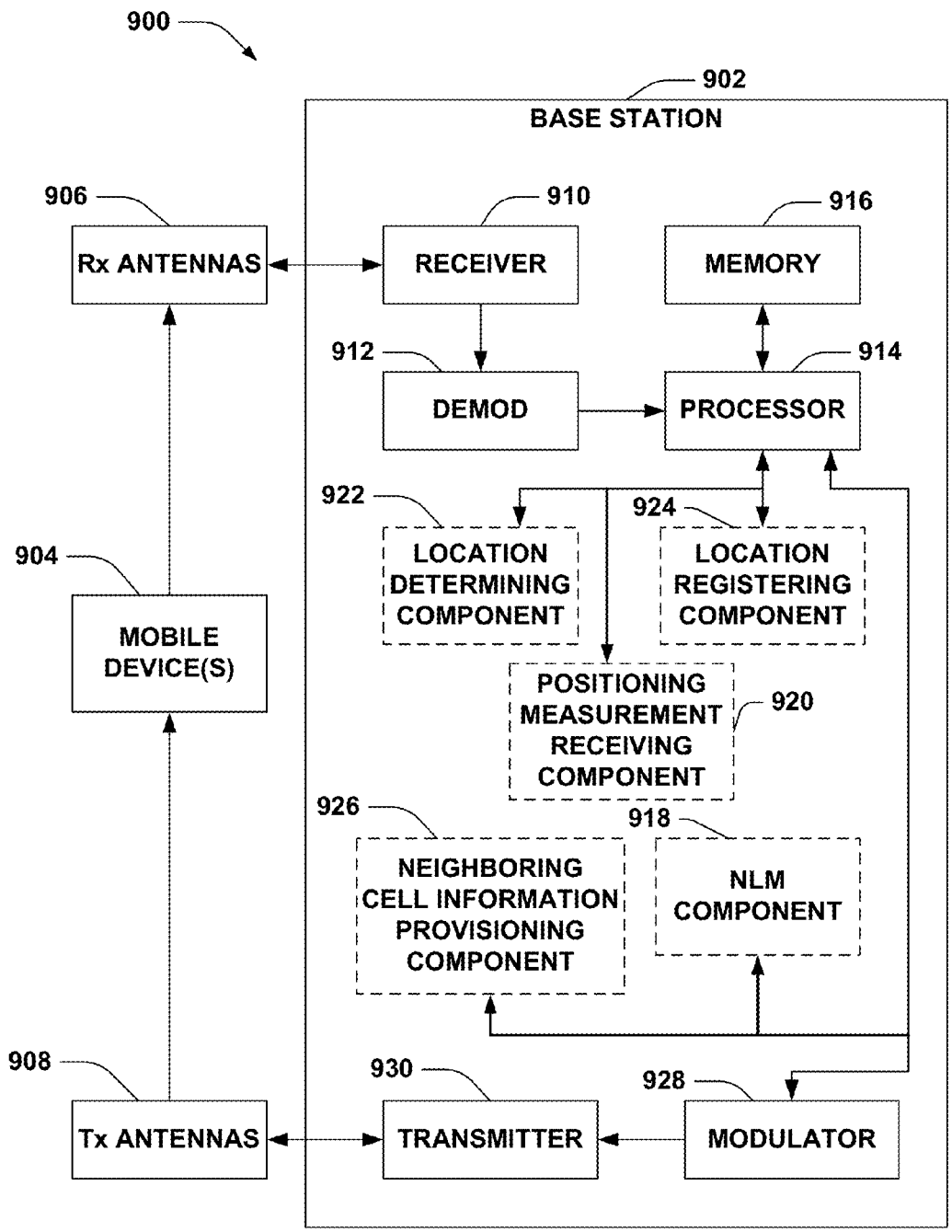
FIG. 9 illustrates an example system that facilitates determining location parameters.

FIG. 9 is an illustration of a system 900 that facilitates providing assistance information for device positioning determination. System 900 comprises a base station 902, which can be substantially any base station (e.g., a small base station, such as a femtocell, picocell, etc., relay node, mobile base station . . . ) having a receiver 910 that receives signal(s) from one or more mobile devices 904 through a plurality of receive antennas 906 (e.g., which can be of multiple network technologies, as described), and a transmitter 930 that transmits to the one or more mobile devices 904 through a plurality of transmit antennas 908 (e.g., which can be of multiple network technologies, as described). In addition, in one example, transmitter 930 can transmit to the mobile devices 904 over a wired front link. Receiver 910 can receive information from one or more receive antennas 906 and is operatively associated with a demodulator 912 that demodulates received information. In addition, in an example, receiver 910 can receive from a wired backhaul link. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 is further optionally coupled to a NLM component 918, which can be similar to NLM component 208 and/or NLM component 310, a positioning measurement receiving component 920, which can be similar to positioning measurement receiving component 210, and/or a location determining component 922, which can be similar to location determining component 212 or location determining component 312. In addition, processor 914 can be optionally coupled to a location registering component 924, which can be similar to location registering component 214 or location registering component 314, and/or a neighboring cell information provisioning component 926, which can be similar to neighboring cell information provisioning component 408. Moreover, for example, processor 914 can modulate signals to be transmitted using modulator 928, and transmit modulated signals using transmitter 930. Transmitter 930 can transmit signals to mobile devices 904 over Tx antennas 908. Furthermore, although depicted as being separate from the processor 914, it is to be appreciated that the NLM component 918, positioning measurement receiving component 920, location determining component 922, location registering component 924, neighboring cell information provisioning component 926, demodulator 912, and/or modulator 928 can be part of the processor 914 or multiple processors (not shown).

Figure 10:
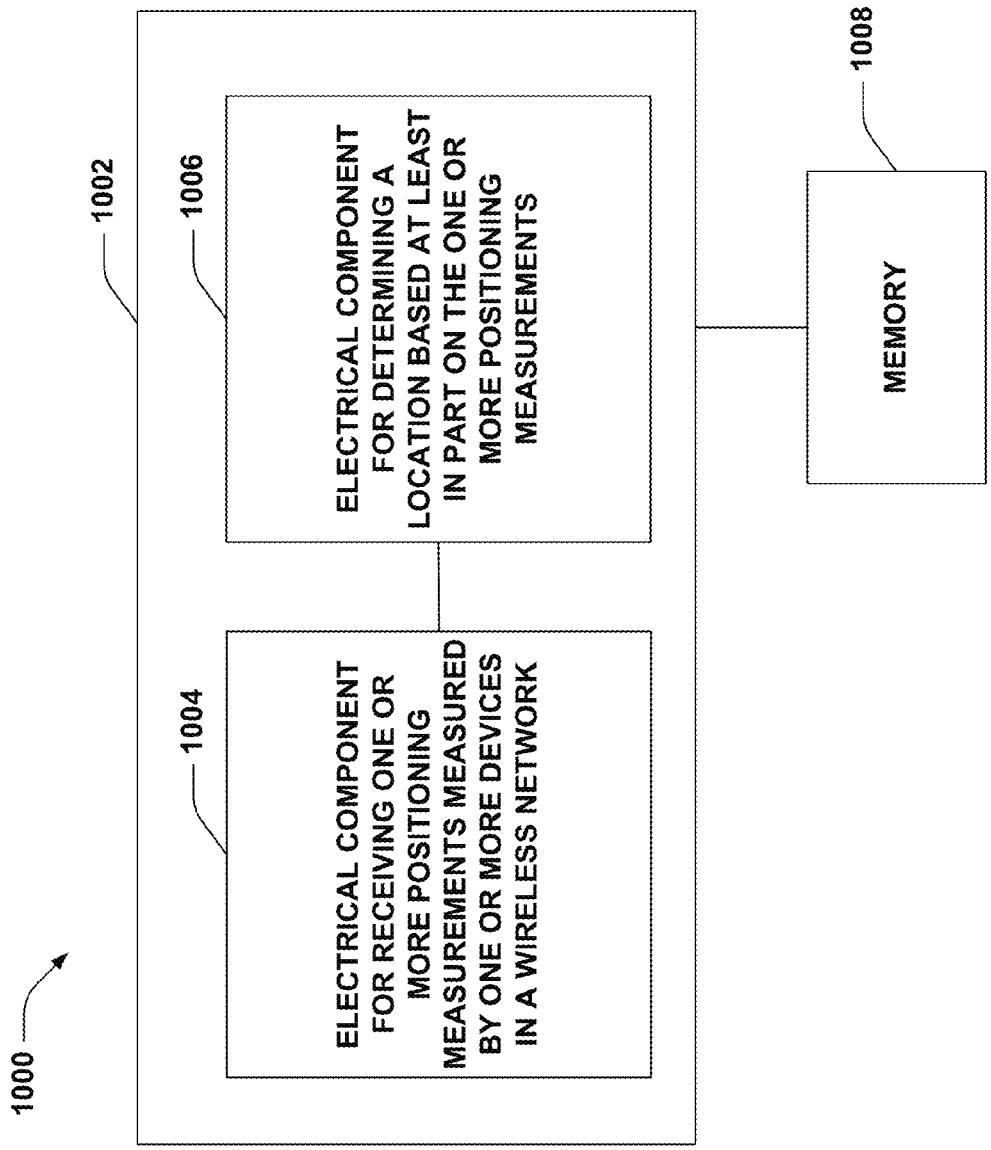
FIG. 10 illustrates an example system for determining a location based on received positioning measurements.

With reference to FIG. 10, illustrated is a system 1000 that determines a location based on received positioning measurements. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving one or more positioning measurements measured by one or more devices in a wireless network in which a HeNB communicates 1004. As described, the one or more devices can be one or more served devices, a co-located NLM, and/or the like. In addition, the one or more positioning measurements can relate to signal strengths and assistance information of one or more base stations, GPS locations, and/or the like.

Further, logical grouping 1002 can comprise an electrical component for determining a location of the HeNB based at least in part on the one or more positioning parameters 1006. As described, for example, electrical component 1006 can determine the location based at least in part on using A-GPS, OTDOA, E-CID, etc. according to the received positioning measurements, and/or the like. For example, electrical component 1004 can include a positioning measurement receiving component 210, as described above. In addition, for example, electrical component 1006, in an aspect, can include a location determining component 212, as described above. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008.

In one example, electrical components 1004 and 1006 can comprise at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
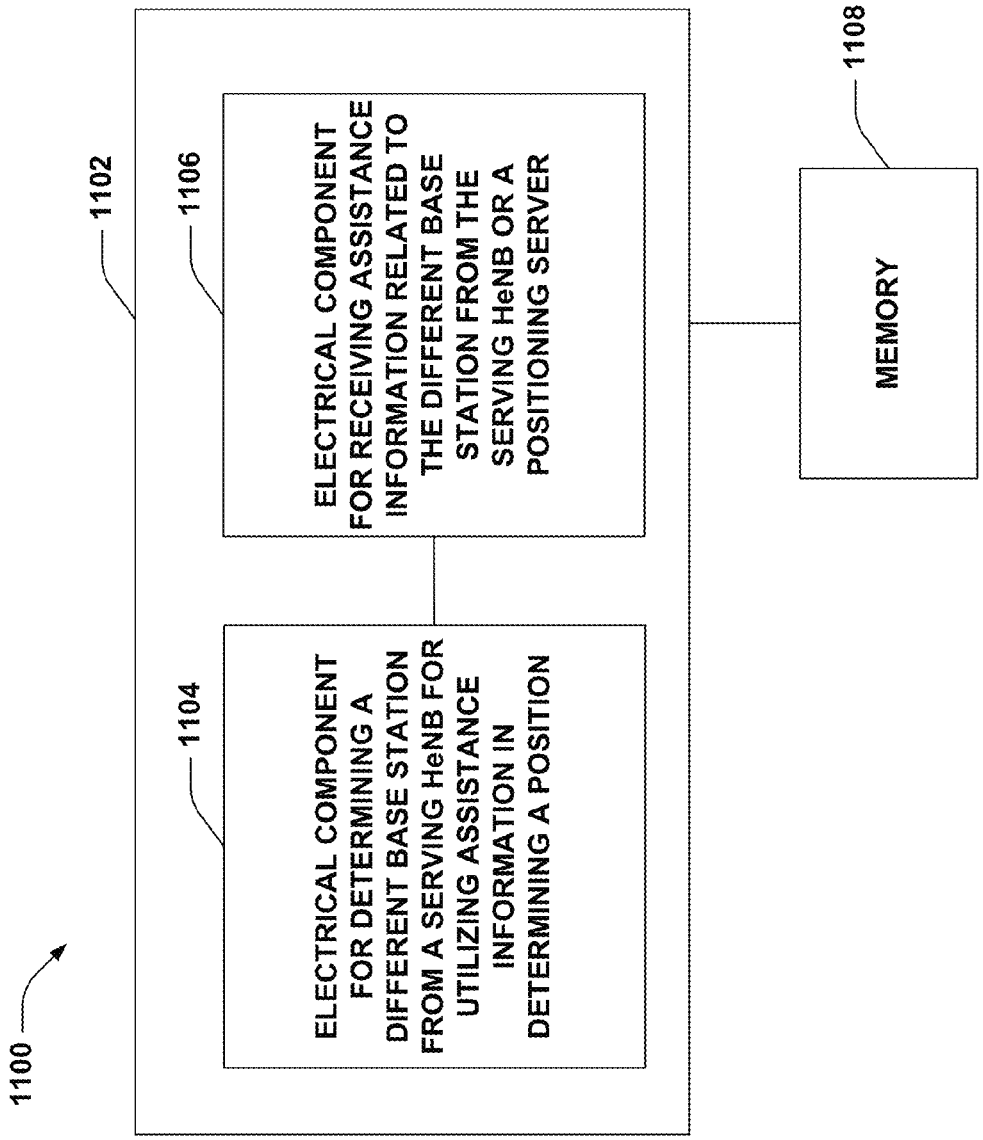
FIG. 11 illustrates an example system that requests assistance information for a base station different from a serving HeNB.

With reference to FIG. 11, illustrated is a system 1100 that requests assistance information. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining a different base station from a serving HeNB for utilizing assistance information in determining a position 1104. As described, for example, electrical component 1104 can determine the different base station based at least in part on detecting a neighboring base station or related cell from which signals are received, specifying a previously visited base station or related cell, receiving information regarding the different base station from the HeNB, etc.

Further, logical grouping 1102 can comprise an electrical component for receiving assistance information related to the different base station from the serving HeNB or a positioning server 1106. For example, in an aspect, electrical component 1104 can include neighboring cell information receiving component 412, as described above. In addition, for example, electrical component 1106, in an aspect, can include assistance information determining component 410, as described above. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108.

In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
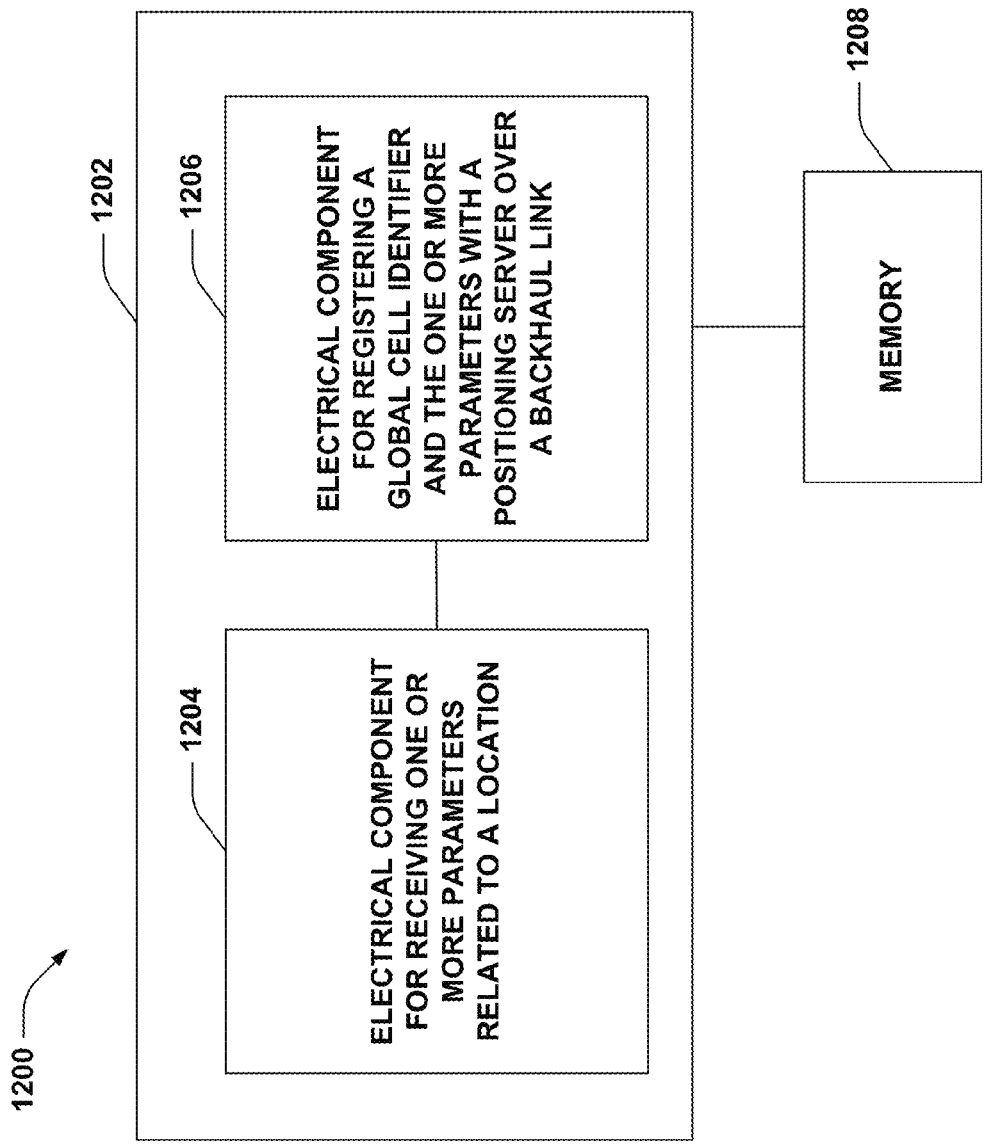
FIG. 12 illustrates an example system that registers location parameters with a positioning server.

With reference to FIG. 12, illustrated is a system 1200 that registers with a positioning server. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving one or more parameters related to a location 1204. As described, the one or more parameters can relate to an address, city, zip code, state, neighboring base station, positioning measurements from one or more devices, and/or the like.

Further, logical grouping 1202 can comprise an electrical component for registering a global cell identifier and the one or more parameters with a positioning server over a backhaul link 1206. For example, in an aspect, electrical component 1204 can include location determining component 312, as described above. In addition, for example, electrical component 1206, in an aspect, can include location registering component 314, as described above. Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208.

In one example, electrical components 1204 and 1206 can comprise at least one processor, or each electrical component 1204 and 1206 can be a corresponding module of at least one processor. Moreover, in an additional or alternative example, electrical components 1204 and 1206 can be a computer program product comprising a computer readable medium, where each electrical component 1204 and 1206 can be corresponding code.

Figure 13:
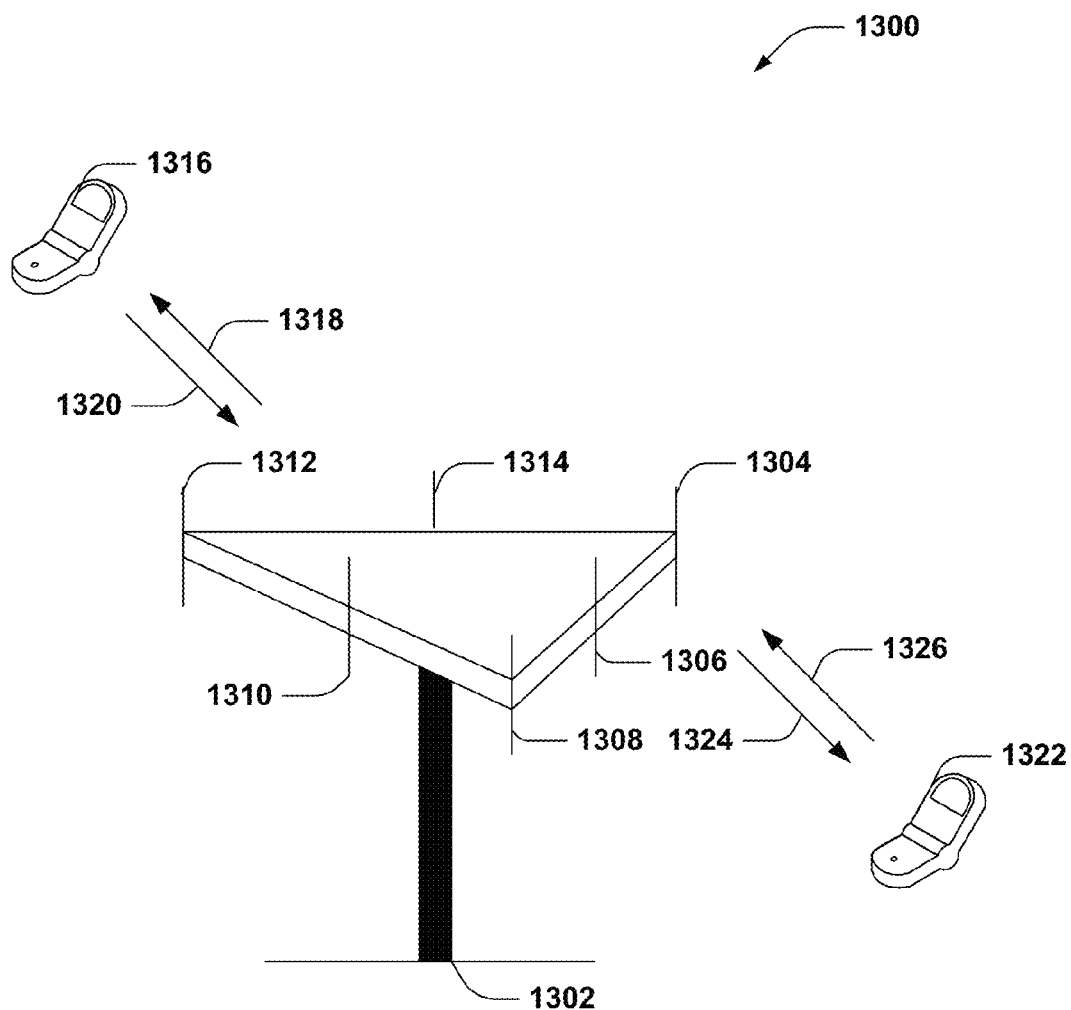
FIG. 13 illustrates an example wireless communication system in accordance with various aspects set forth herein.

Referring now to FIG. 13, a wireless communication system 1300 is illustrated in accordance with various embodiments presented herein. System 1300 comprises a base station 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1302 can communicate with one or more mobile devices such as mobile device 1316 and mobile device 1322; however, it is to be appreciated that base station 1302 can communicate with substantially any number of mobile devices similar to mobile devices 1316 and 1322. Mobile devices 1316 and 1322 can be, for example, cellular phones, smart phones, laptops, handheld communication devices, handheld computing devices, satellite radios, global positioning systems, PDAs, and/or any other suitable device for communicating over wireless communication system 1300. As depicted, mobile device 1316 is in communication with antennas 1312 and 1314, where antennas 1312 and 1314 transmit information to mobile device 1316 over a forward link 1318 and receive information from mobile device 1316 over a reverse link 1320. Moreover, mobile device 1322 is in communication with antennas 1304 and 1306, where antennas 1304 and 1306 transmit information to mobile device 1322 over a forward link 1324 and receive information from mobile device 1322 over a reverse link 1326. In a frequency division duplex (FDD) system, forward link 1318 can utilize a different frequency band than that used by reverse link 1320, and forward link 1324 can employ a different frequency band than that employed by reverse link 1326, for example. Further, in a time division duplex (TDD) system, forward link 1318 and reverse link 1320 can utilize a common frequency band and forward link 1324 and reverse link 1326 can utilize a common frequency band.

Each group of antennas and/or the area in which they are designated to communicate can be referred to as a sector of base station 1302. For example, antenna groups can be designed to communicate to mobile devices in a sector of the areas covered by base station 1302. In communication over forward links 1318 and 1324, the transmitting antennas of base station 1302 can utilize beamforming to improve signal-to-noise ratio of forward links 1318 and 1324 for mobile devices 1316 and 1322. Also, while base station 1302 utilizes beamforming to transmit to mobile devices 1316 and 1322 scattered randomly through an associated coverage, mobile devices in neighboring cells can be subject to less interference as compared to a base station transmitting through a single antenna to all its mobile devices. Moreover, mobile devices 1316 and 1322 can communicate directly with one another using a peer-to-peer or ad hoc technology as depicted. According to an example, system 1300 can be a multiple-input multiple-output (MIMO) communication system.

Figure 14:
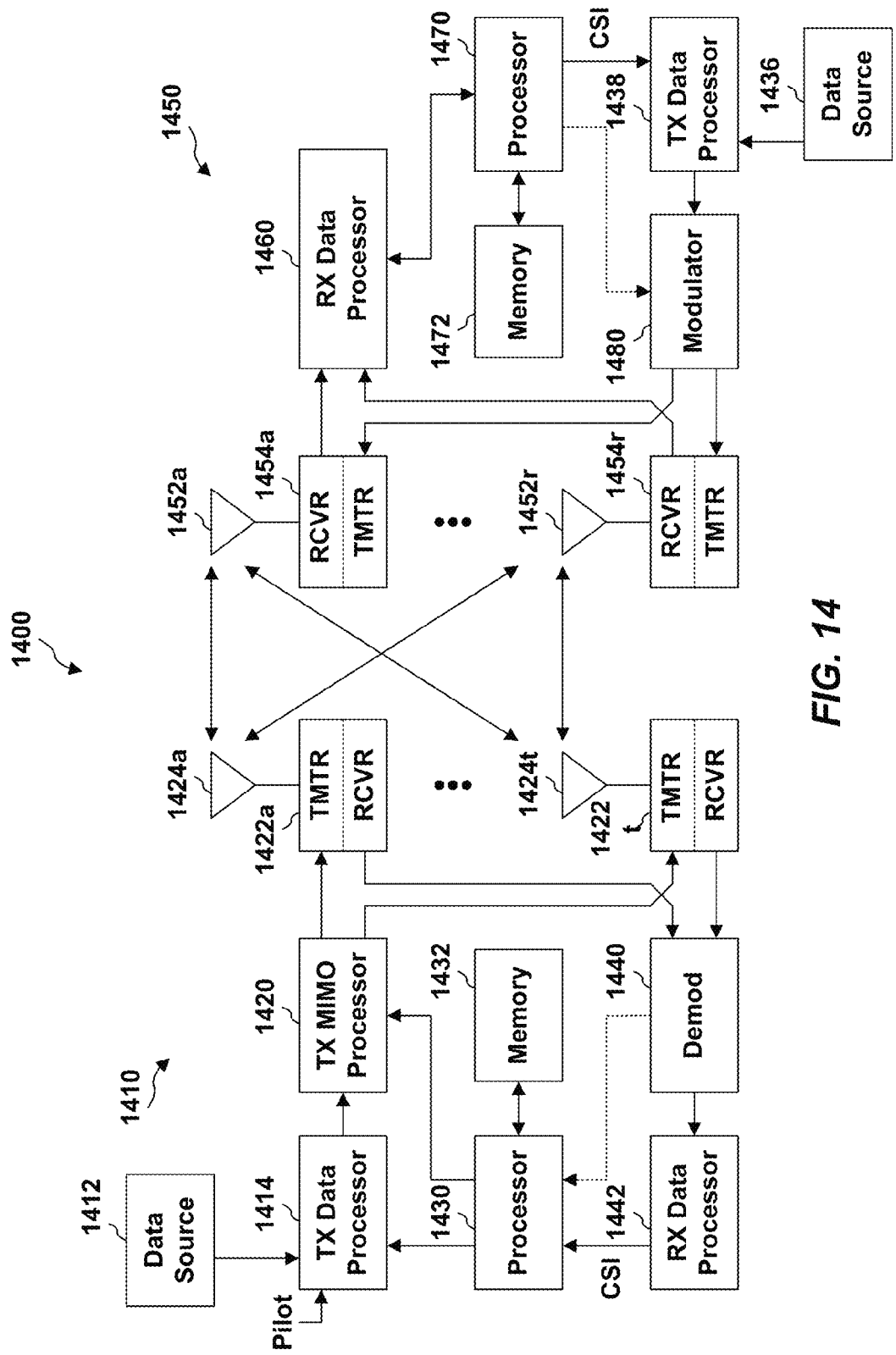
FIG. 14 illustrates an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-4 and 9-13), mobile devices, (FIG. 8), and/or methods (FIGS. 5-7) described herein to facilitate wireless communication there between. For example, components or functions of the systems and/or methods described herein can be part of a memory 1432 and/or 1472 or processors 1430 and/or 1470 described below, and/or can be executed by processors 1430 and/or 1470 to perform the disclosed functions.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides NT modulation symbol streams to NT transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1422a through 1422t are transmitted from NT antennas 1424a through 1424t, respectively.

At mobile device 1450, the transmitted modulated signals are received by NR antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the NR received symbol streams from NR receivers 1454 based on a particular receiver processing technique to provide NT "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

Figure 15:
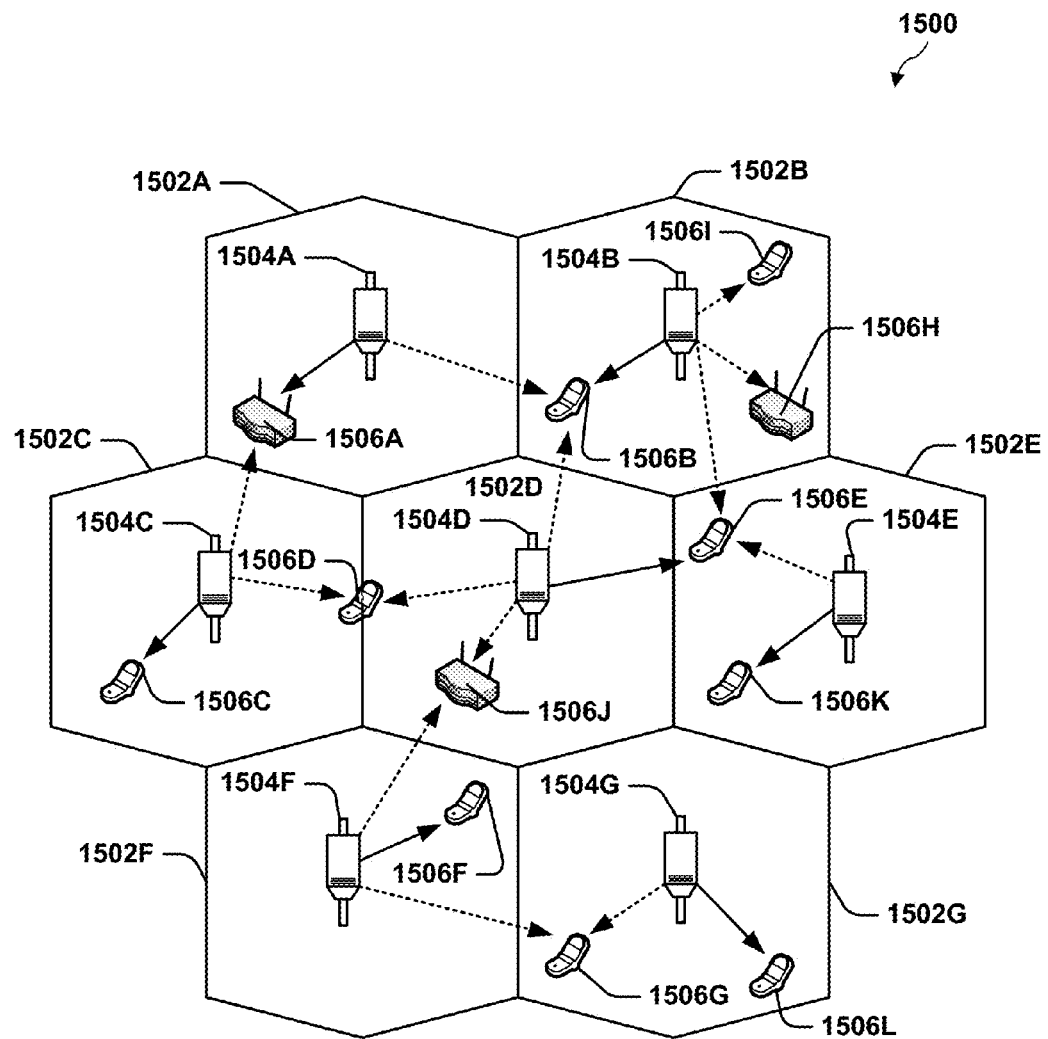
FIG. 15 illustrates a wireless communication system, configured to support a number of devices, in which the aspects herein can be implemented.

FIG. 15 illustrates a wireless communication system 1500, configured to support a number of users, in which the teachings herein may be implemented. The system 1500 provides communication for multiple cells 1502, such as, for example, macro cells 1502A-1502G, with each cell being serviced by a corresponding access node 1504 (e.g., access nodes 1504A-1504G). As shown in FIG. 15, access terminals 1506 (e.g., access terminals 1506A-1506L) can be dispersed at various locations throughout the system over time. Each access terminal 1506 can communicate with one or more access nodes 1504 on a forward link (FL) and/or a reverse link (RL) at a given moment, depending upon whether the access terminal 1506 is active and whether it is in soft handoff, for example. The wireless communication system 1500 can provide service over a large geographic region.

Figure 16:
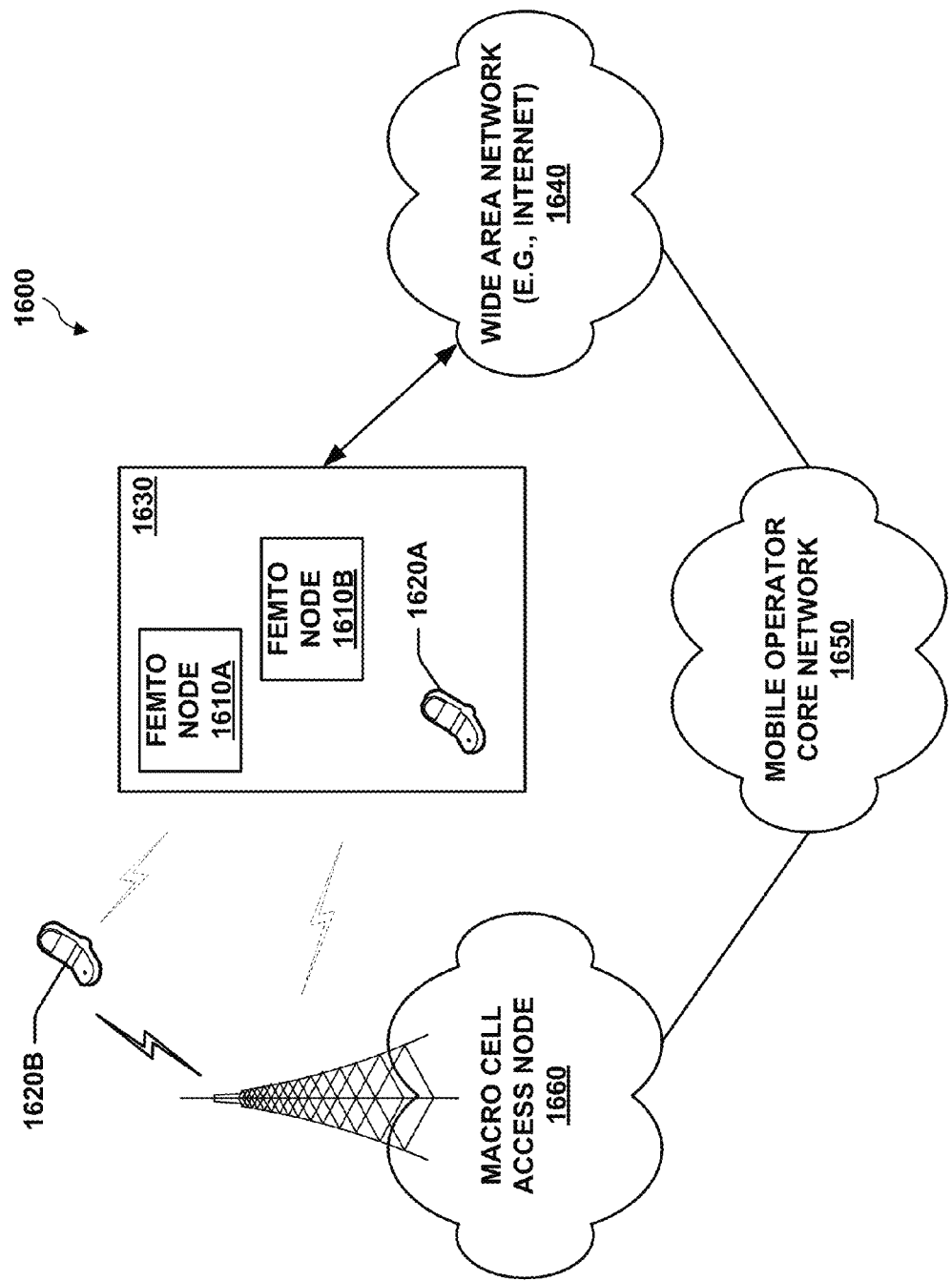
FIG. 16 illustrates an exemplary communication system to enable deployment of femtocells within a network environment.

FIG. 16 illustrates an exemplary communication system 1600 where one or more femto nodes are deployed within a network environment. Specifically, the system 1600 includes multiple femto nodes 1610A and 1610B (e.g., femtocell nodes or HeNB) installed in a relatively small scale network environment (e.g., in one or more user residences 1630). Each femto node 1610 can be coupled to a wide area network 1640 (e.g., the Internet) and a mobile operator core network 1650 via a digital subscriber line (DSL) router, a cable modem, a wireless link, or other connectivity means (not shown). As will be discussed below, each femto node 1610 can be configured to serve associated access terminals 1620 (e.g., access terminal 1620A) and, optionally, alien access terminals 1620 (e.g., access terminal 1620B). In other words, access to femto nodes 1610 can be restricted such that a given access terminal 1620 can be served by a set of designated (e.g., home) femto node(s) 1610 but may not be served by any non-designated femto nodes 1610 (e.g., a neighbor's femto node).

Figure 17:
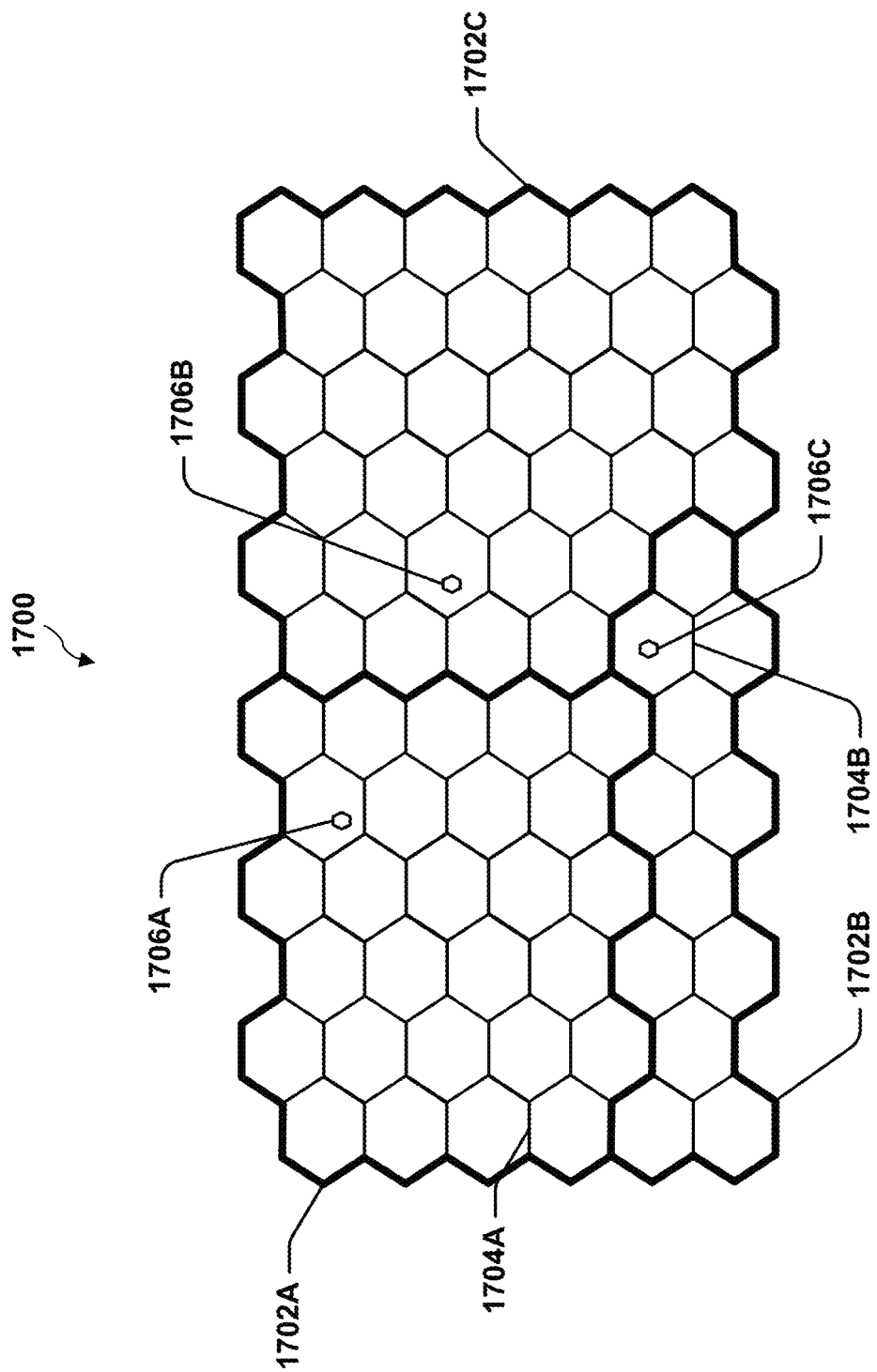
FIG. 17 illustrates an example of a coverage map having several defined tracking areas.

FIG. 17 illustrates an example of a coverage map 1700 where several tracking areas 1702 (or routing areas or location areas) are defined, each of which includes several macro coverage areas 1704. Here, areas of coverage associated with tracking areas 1702A, 1702B, and 1702C are delineated by the wide lines and the macro coverage areas 1704 are represented by the hexagons. The tracking areas 1702 also include femto coverage areas 1706. In this example, each of the femto coverage areas 1706 (e.g., femto coverage area 1706C) is depicted within a macro coverage area 1704 (e.g., macro coverage area 1704B). It should be appreciated, however, that a femto coverage area 1706 may not lie entirely within a macro coverage area 1704. In practice, a large number of femto coverage areas 1706 can be defined with a given tracking area 1702 or macro coverage area 1704. Also, one or more pico coverage areas (not shown) can be defined within a given tracking area 1702 or macro coverage area 1704.

Referring again to FIG. 16, the owner of a femto node 1610 can subscribe to mobile service, such as, for example, 3G mobile service, offered through the mobile operator core network 1650. In addition, an access terminal 1620 can be capable of operating both in macro environments and in smaller scale (e.g., residential) network environments. Thus, for example, depending on the current location of the access terminal 1620, the access terminal 1620 can be served by an access node 1660 or by any one of a set of femto nodes 1610 (e.g., the femto nodes 1610A and 1610B that reside within a corresponding user residence 1630). For example, when a subscriber is outside his home, he is served by a standard macro cell access node (e.g., node 1660) and when the subscriber is at home, he is served by a femto node (e.g., node 1610A). Here, it should be appreciated that a femto node 1610 can be backward compatible with existing access terminals 1620.

A femto node 1610 can be deployed on a single frequency or, in the alternative, on multiple frequencies. Depending on the particular configuration, the single frequency or one or more of the multiple frequencies can overlap with one or more frequencies used by a macro cell access node (e.g., node 1660). In some aspects, an access terminal 1620 can be configured to connect to a preferred femto node (e.g., the home femto node of the access terminal 1620) whenever such connectivity is possible. For example, whenever the access terminal 1620 is within the user's residence 1630, it can communicate with the home femto node 1610.

In some aspects, if the access terminal 1620 operates within the mobile operator core network 1650 but is not residing on its most preferred network (e.g., as defined in a preferred roaming list), the access terminal 1620 can continue to search for the most preferred network (e.g., femto node 1610) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1620 can limit the search for specific band and channel. For example, the search for the most preferred system can be repeated periodically. Upon discovery of a preferred femto node, such as femto node 1610, the access terminal 1620 selects the femto node 1610 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1610 that reside within the corresponding user residence 1630). In some implementations, a femto node can be restricted to not provide, for at least one access terminal, at least one of: signaling, data access, registration, paging, or service.

In some aspects, a restricted femto node (which can also be referred to as a Closed Subscriber Group HeNB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
   determining, at a mobile device, a different base station from a serving home evolved Node B (HeNB) for utilizing assistance information in determining a position of the mobile device, wherein the determining the different base station is responsive to a determination that the serving HeNB is not registered with a positioning server;
   receiving assistance information related to the different base station from the serving HeNB or the positioning server; and
   determining, by the mobile device, the position of the mobile device using the assistance information related to the different base station received from the serving HeNB or the positioning server.

2. The method of claim 1, wherein the determining the different base station comprises determining the different base station based on, at least in part, detecting a signal from the different base station.

3. The method of claim 1, wherein the determining the different base station comprises determining the different base station based on, at least in part, the different base station being a previously visited base station.

4. The method of claim 1, further comprising receiving an indication of the different base station from the HeNB.

5. A mobile device for requesting assistance information in determining positioning, comprising:
   at least one processor configured to:
      determine, at the mobile device, a different base station from a serving home evolved Node B (HeNB) for utilizing assistance information in determining a position of the mobile device, wherein the at least one processor is configured to determine the different base station responsive to a determination that the serving HeNB is not registered with a positioning server;
      obtain assistance information related to the different base station from the serving HeNB or the positioning server; and
      determine, by the mobile device, the position of the mobile device using the assistance information related to the different base station received from the serving HeNB or the positioning server; and
   a memory coupled to the at least one processor.

6. The mobile device of claim 5, wherein the at least one processor configured to determine the different base station comprises the at least one processor configured to determine the different base station based on, at least in part, the reception of a signal of the different base station.

7. The mobile device of claim 5, wherein the at least one processor configured to determine the different base station comprises the at least one processor configured to determine the different base station based on, at least in part, the different base station being a previously visited base station.

8. The mobile device of claim 5, wherein the at least one processor is further configured to receive an indication of the different base station from the HeNB.

9. A mobile device for requesting assistance information for determining positioning, comprising:
   means for determining, at the mobile device, a different base station from a serving home evolved Node B (HeNB) for utilizing assistance information in determining a position of the mobile device, wherein the means for determining the different base station is responsive to a determination that the serving HeNB is not registered with a positioning server;
   means for receiving assistance information related to the different base station from the serving HeNB or the positioning server; and means for determining the position of the mobile device using the assistance information related to the different base station received from the serving HeNB or the positioning server.

10. The mobile device of claim 9, wherein the means for determining the different base station comprises means for determining the different base station based, at least in part, on one or more signals received from the different base station.

11. The mobile device of claim 9, wherein the means for determining the different base station comprises means for determining the different base station based, at least in part, on the different base station being a previously visited base station.

12. The mobile device of claim 9, wherein the means for determining further receives an indication of the different base station from the HeNB.

13. A computer program product for requesting assistance information for determining a position, comprising:
 a non-transitory computer-readable medium, comprising:
  code for instructing at least one mobile device to determine a different base station from a serving home evolved Node B (HeNB) for utilizing assistance information in determining a position of the mobile device, wherein the code for instructing the at least one mobile device to determine the different base station comprises code for instructing the at least one mobile device to determine the different base station responsive to a determination that the serving HeNB is not registered with a positioning server;
  code for instructing the at least one mobile device to obtain assistance information related to the different base station from the serving HeNB or the positioning server; and
  code for causing the at least one mobile device to determine the position of the mobile device using the assistance information related to the different base station received from the serving HeNB or the positioning server.

14. The computer program product of claim 13, wherein the non-transitory computer-readable medium further comprises code for instructing the at least one mobile device to process a received signal of the different base station.

15. The computer program product of claim 13, wherein the non-transitory computer-readable medium further comprises code for instructing the at least one mobile device to determine whether the different base station is a previously visited base station.

16. The computer program product of claim 13, wherein the non-transitory computer-readable medium further comprises code for instructing the at least one mobile device to process a received indication of the different base station from the HeNB.

17. A mobile device for requesting assistance information for determining positioning, comprising:
 a neighboring cell information receiving component in the mobile device for determining a different base station from a serving home evolved Node B (HeNB) for utilizing assistance information in determining a position of the mobile device, wherein the determining the different base station is responsive to a determination that the serving HeNB is not registered with a positioning server;
 an assistance information receiving component for receiving assistance information related to the different base station from the serving HeNB or the positioning server; and
 a position measurement component for determining the position of the mobile device using the assistance information related to the different base station received from the serving HeNB or the positioning server.

18. The mobile device of claim 17, wherein the neighboring cell information receiving component detects the different base station based at least in part on one or more signals received from the different base station.

19. The mobile device of claim 17, wherein the neighboring cell information receiving component determines the different base station as a previously visited base station.

20. The mobile device of claim 17, wherein the neighboring cell information receiving component obtains an indication of the different base station from the HeNB.

* * * * *